United States Patent
Onuki et al.

(10) Patent No.: US 7,174,053 B2
(45) Date of Patent: Feb. 6, 2007

(54) INFORMATION PROCESSING APPARATUS

(75) Inventors: Masao Onuki, Machida (JP); Akira Ohmura, Kawasaki (JP)

(73) Assignee: Nikon Corporation, Tokyo (JP)

( * ) Notice: Subject to any disclaimer, the term of this patent is extended or adjusted under 35 U.S.C. 154(b) by 607 days.

(21) Appl. No.: 10/330,270

(22) Filed: Dec. 30, 2002

(65) Prior Publication Data

US 2003/0095198 A1 May 22, 2003

Related U.S. Application Data

(63) Continuation of application No. 10/084,304, filed on Feb. 28, 2002, now abandoned, which is a continuation of application No. 09/898,016, filed on Jul. 5, 2001, now abandoned, which is a continuation of application No. 09/551,646, filed on Apr. 18, 2000, now abandoned, which is a continuation of application No. 08/950,186, filed on Oct. 14, 1997, now abandoned.

(30) Foreign Application Priority Data

Oct. 14, 1996 (JP) .................................. 08-270798

(51) Int. Cl.
G06K 9/54 (2006.01)
H04N 5/222 (2006.01)

(52) U.S. Cl. .................................. 382/305; 348/333.05

(58) Field of Classification Search ................ 382/305, 382/312, 298; 348/333.05, 231.99, 333.02; 715/526, 835, 763, 827; 355/36; 358/1.9, 358/453; 345/660

See application file for complete search history.

(56) References Cited

U.S. PATENT DOCUMENTS

| 4,390,261 A | 6/1983 | Yamamoto et al. ............ 707/3 |
| 5,113,455 A | 5/1992 | Scott .......................... 382/298 |
| 5,164,831 A | 11/1992 | Kuchta et al. ........... 348/231.7 |
| 5,541,656 A | 7/1996 | Kare et al. ............. 348/333.02 |
| 5,680,225 A * | 10/1997 | Hirabayashi et al. ....... 358/451 |
| 5,706,457 A | 1/1998 | Dwyer et al. ............... 715/835 |
| 5,717,838 A | 2/1998 | LeClair ...................... 358/1.9 |
| 5,751,286 A | 5/1998 | Barber et al. ............... 715/835 |
| 5,761,655 A * | 6/1998 | Hoffman ........................ 707/4 |
| 5,790,114 A | 8/1998 | Geaghan et al. ............ 715/763 |
| 5,819,261 A | 10/1998 | Takahashi et al. ............. 707/3 |
| 5,845,018 A | 12/1998 | Breish ........................ 382/276 |
| 5,943,054 A | 8/1999 | Hirano et al. ............... 715/827 |
| 5,974,386 A | 10/1999 | Ejima et al. ................ 704/276 |
| 5,982,916 A | 11/1999 | Kuhn ......................... 382/132 |
| 6,005,679 A * | 12/1999 | Haneda ...................... 358/453 |
| 6,016,184 A * | 1/2000 | Haneda ........................ 355/36 |
| 6,154,755 A | 11/2000 | Dellert et al. ............... 715/526 |
| 6,157,389 A | 12/2000 | Knowlton ................... 345/660 |
| 6,192,191 B1 | 2/2001 | Suga et al. ................. 386/120 |

* cited by examiner

*Primary Examiner*—Kanjibhai Patel
(74) *Attorney, Agent, or Firm*—Oliff & Berridge, PLC

(57) ABSTRACT

Thumbnail images are promptly created while reducing the required memory capacity for storing the thumbnail images. When input (of an image or a command) is not completed in more than a prescribed time period, only the picture images photographed on that day from among the photo-images stored in a memory are read to create thumbnail images. The created thumbnail images are stored in a buffer memory. When set to the reproduction mode, the thumbnail images stored in the buffer memory are read and displayed on a screen in a list format. Furthermore, when the power is in the OFF position, the thumbnail images stored in the buffer memory can be deleted.

42 Claims, 13 Drawing Sheets

2x2 PIXEL AREA

| a | b | a | b | a | b | a | b |
|---|---|---|---|---|---|---|---|
| c | d | c | d | c | d | c | d |
| a | b | a | b | a | b | a | b |
| c | d | c | d | c | d | c | d |
| a | b | a | b | a | b | a | b |
| c | d | c | d | c | d | c | d |

CCD 20

FIG. 5

3x3 PIXEL AREA

| a | b | c | a | b | c | a | b | c |
|---|---|---|---|---|---|---|---|---|
| d | e | f | d | e | f | d | e | f |
| g | h | i | g | h | i | g | h | i |
| a | b | c | a | b | c | a | b | c |
| d | e | f | d | e | f | d | e | f |
| g | h | i | g | h | i | g | h | i |

CCD 20

FIG. 6

INFORMATION PROCESSING APPARATUS

This is a Continuation of application Ser. No. 10/084,304 filed Feb. 28, 2002, now abandoned which in turn is a continuation of application Ser. No. 09/898,016 filed Jul. 5, 2001(now abandoned), which in turn is a continuation of application Ser. No. 09/551,646 filed Apr. 18, 2000 (now abandoned), which in turn is a continuation of application Ser. No. 08/950,186 filed Oct. 14, 1997 (now abandoned). The entire disclosure of the prior applications is hereby incorporated by reference herein in its entirety.

INCORPORATION BY REFERENCE

The disclosure of the following priority application is herein incorporated by reference: Japanese Patent Application No. 8-270798, filed Oct. 14, 1996.

BACKGROUND OF THE INVENTION

1. Field of Invention

The present invention relates to an information processing apparatus, and in particular to an information processing apparatus that photographs a photographic object and has the ability to record it as a picture image as well as reproduce the recorded picture image.

2. Description of Related Art

Conventional electronic cameras can, for example, reproduce a photographed image (hereafter abbreviated as photo-image). Typically, the photo-images are displayed in the order that they were photographed.

However, with this type of reproduction method, since the order that the photo-images can be reproduced is fixed, there is the problem that it is impossible to select and reproduce photo-images at one's own discretion. Therefore, when reproducing a photo-image, the photo-image is reduced by a prescribed ratio thereby creating a reduced image (hereafter referred to as a thumbnail image). A plurality of thumbnail images can then be displayed in a list format on the screen. Further, by allowing the user to select from the thumbnail images according to the desire of the user, the reproducing of photo-images at one's discretion can be achieved.

However, since photo-images are formed of a plurality of pixel data, various processes are required to create a thumbnail image from a photo-image. Accordingly, there is the problem that a large amount of time is required in order to create each thumbnail image.

Therefore, for example, a thumbnail image can be generated each time photography is performed, and by storing each thumbnail image in memory, the trouble of repeatedly generating the thumbnail image can be avoided. However, with this type of method, since a portion of memory that stores the photo-image is occupied by the thumbnail image, there is the problem that the number of photo-images that can be recorded are limited.

In addition, the following problem can occur when attempting to generate a thumbnail image upon each occurrence of photography even with sufficient memory. With the so-called successive photo mode, in which a series of photo-images are successively taken, it is desirable to have the most number of photos taken within a given time period. However, if a thumbnail image was generated upon the imaging of each frame (i.e., each photo-image) of photography, the speed of successive photography would decrease, thereby creating a problem.

In addition, even if a thumbnail image is generated upon each frame of photography without limiting successive photography, the response of the device to the operation of the user will be slow.

SUMMARY OF THE INVENTION

The present invention takes into consideration the above circumstances and makes it possible to reduce the time required to generate thumbnail images as well as to reduce the area of memory occupied by thumbnail images.

Further, the present invention makes it possible to operate in the successive photo mode without decreasing the successive photography speed, and makes photography possible without slowing the response of the device.

According to one aspect of the invention, an information processing apparatus includes a memory in which picture images of photographic objects are recorded and a thumbnail image generator that reduces by a prescribed ratio the picture image recorded in the memory, thereby creating the thumbnail image. A controller controls the thumbnail image generator. A display device displays the thumbnail images created by the thumbnail image generator.

BRIEF DESCRIPTION OF THE DRAWINGS

The invention will be described in conjunction with the following drawings in which like reference numerals designate like elements and wherein:

FIG. 5 is a figure describing the process for thinning the pixels when the camera is in the L mode;

FIG. 6 is a figure describing the process for thinning the pixels when the camera is in the S mode;

DETAILED DESCRIPTION OF PREFERRED EMBODIMENTS

An embodiment of the present invention is explained hereafter with reference to the figures.

Figure 1:
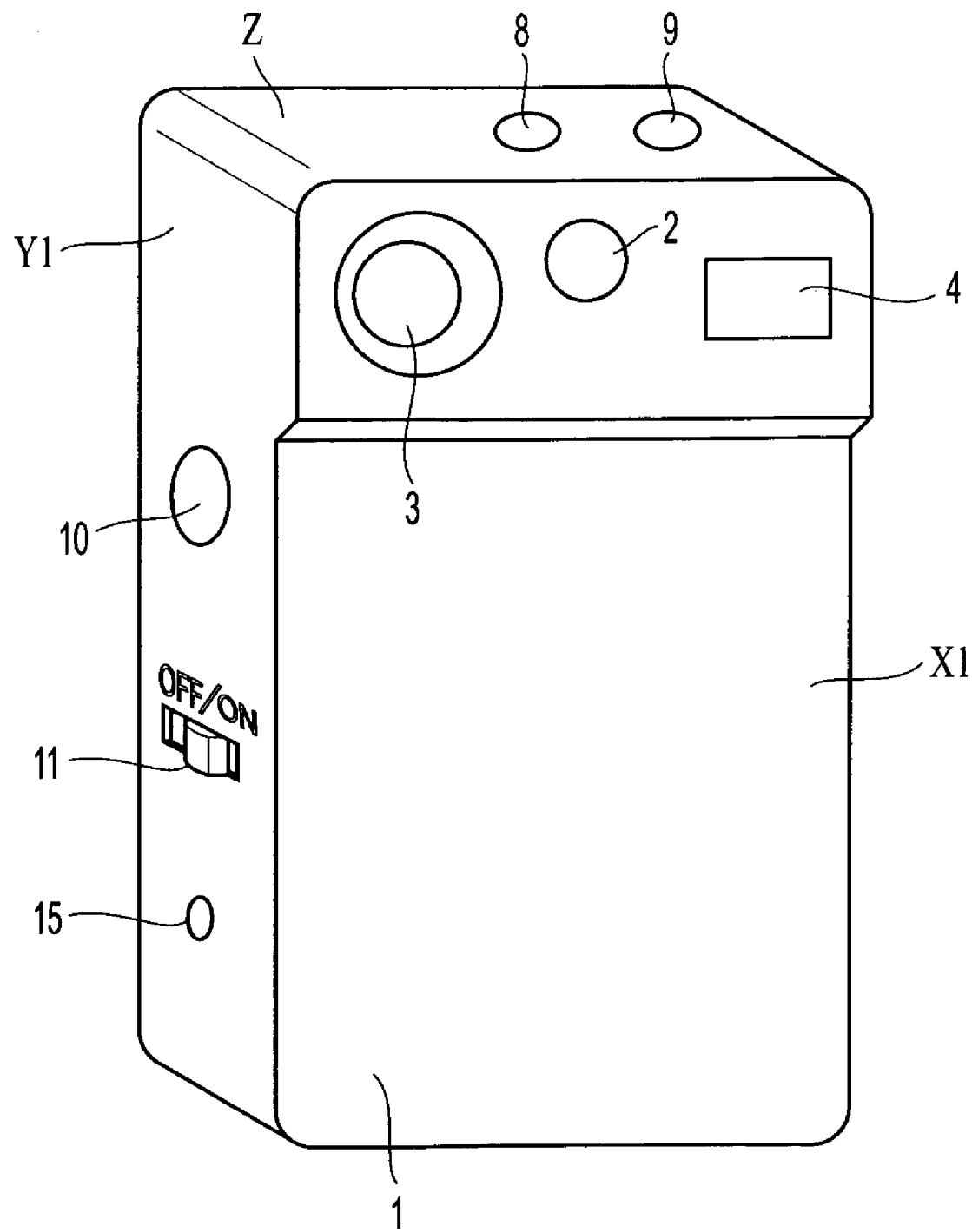
FIG. 1 is a perspective view of a front of an electronic camera according to one embodiment of the present invention.
Figure 2:
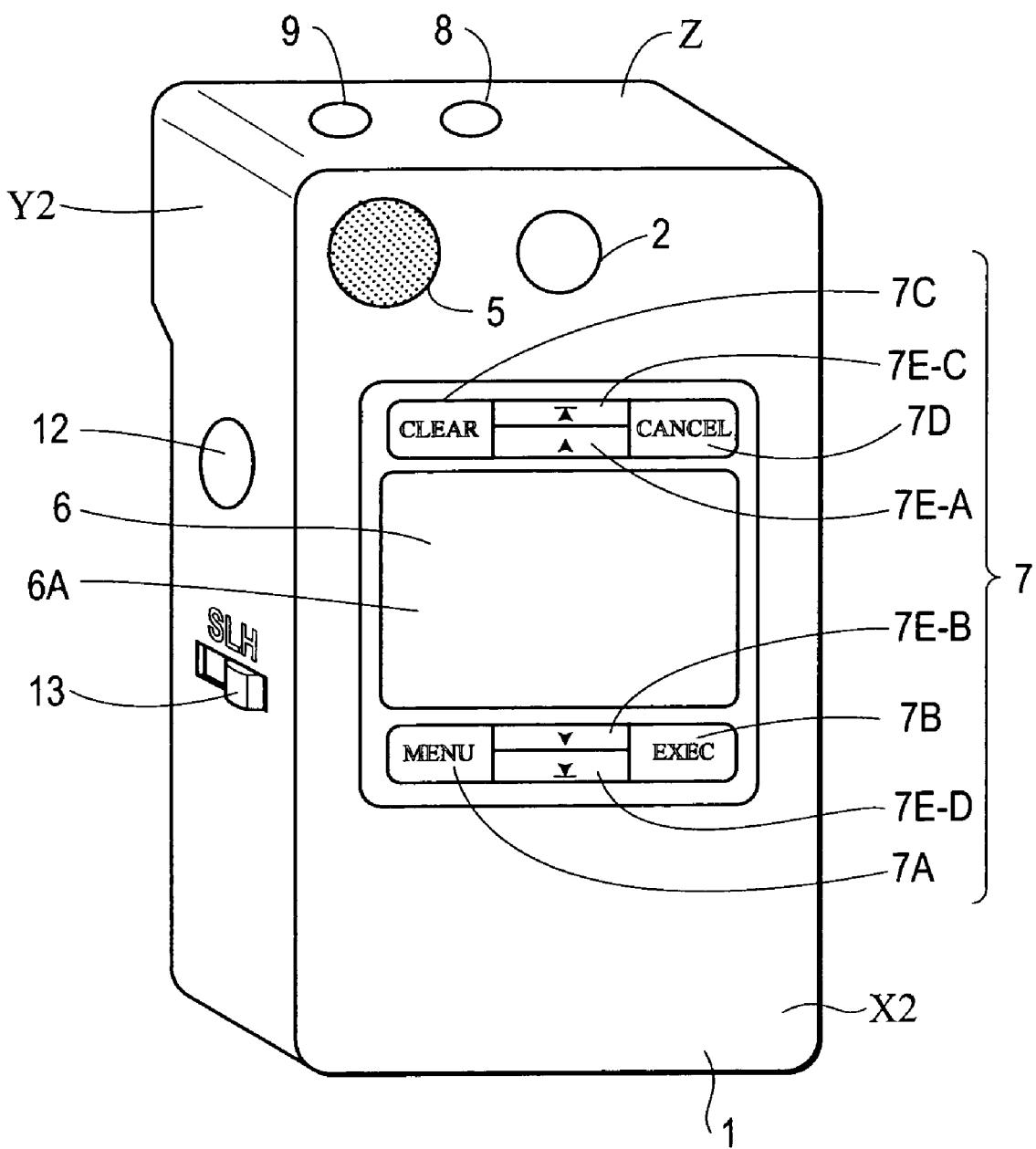
FIG. 2 is a perspective view of the rear of the electronic camera shown in FIG. 1.

FIGS. 1 and 2 show the composition of one embodiment of an electronic camera 1 according to the present invention. With the electronic camera of the present embodiment, when photographing an object, the side facing the photographic object is designated as X1, and the side facing the user is designated as X2. Provided on the upper end of the side X1 are a viewfinder 2, which is used to confirm the photographic range of the object, a photographic lens 3, which takes in the photo-image of the photographic object, and a light emitting component (a strobe lamp) 4, which emits light when illuminating the photographic object.

On the upper end (the portion having the viewfinder 2, the photographic lens 3 and the light emitting component 4 of the X1 side) of the side X2 opposing the X1 side, is a speaker 5, which outputs sound that is recorded in the electronic camera 1, as well as the viewfinder 2. In addition, a LCD 6 and operation keys 7 (menu key 7A, execution key 7B, clear key 7C, cancel key 7D, and scroll keys 7E-A, 7E-B, 7E-C and 7E-D), are formed on the X2 side, directly below the viewfinder 2, the photographic lens 3, the light emitting component 4, and the speaker 5. A touch tablet 6A is provided on the surface of the LCD 6. When contacted, for example, by a pen-shaped indicator to be described hereafter, the touch tablet 6A outputs the position data that corresponds to the indicated position.

The touch tablet 6A is formed of transparent materials such as resin or so forth. Thus, the user, through the touch tablet 6A, can observe the image that is displayed on the LCD 6, which is formed below the touch tablet 6A.

The operation keys 7 are operated when the recorded data is to be reproduced and displayed in the LCD 6. More specifically, the menu key 7A is operated when displaying the menu screen on the LCD 6. The execution key 7B is operated when reproducing the recorded information selected by the user. The clear key 7C is operated when clearing the recorded information. The cancel key 7D is operated when canceling the reproduction process of the recorded information. The scroll keys are operated when scrolling the screen in the up and down directions when the list of recorded information is displayed on the LCD 6. The scroll keys include the line scroll up key 7E-A and the line scroll down key 7E-B which scrolls either 1 line or units of multiple lines. The page scroll up key 7E-C and the page scroll down key 7E-D scroll in units of pages.

The Z side, which is the top side of the electronic camera 1, includes an audio microphone 8, which collects audio sound, and an earphone jack 9, where earphones not shown in the figure are connected.

The left side (the Y1 side) includes a release switch 10, which is operated when photographing an object, a power switch 11, and an AC adapter jack 15 for connecting to an AC adapter.

Meanwhile, the Y2 side (the right side), which opposes the Y1 side, includes an audio recording switch 12, which is operated when recording audio sound, and a successive photo mode switch 13, which is operated when switching to the successive mode of photography. Preferably, the audio recording switch 12 is formed at nearly the same height as the release switch 10 on the Y1 side, thereby allowing a composition that does not provide discomfort when held from either the left or right. The height of the audio recording switch 12 and of the release switch 10 can also be different in order to prevent erroneous pressing of the switch arranged on the opposite side of the finger used to off-set the moment of pressing force when pressing one switch.

The successive photo mode switch 13 is used when setting between either photography of one frame of an object or photography of a predetermined number of frames when the user photographs an object by pressing the release switch 10. For example, when the indicator of the successive photo mode switch 13 is switched to the position where the [S] is printed (in other words, switched to the S mode), only one frame of photography occurs when pressing the release switch 10. Further, when the indicator of the successive photo mode switch 13 is switched to the position where the [L] is printed (in other words, switched to the L mode), 8 frames per second (in other words, low speed successive mode) of photography are performed during the time that the release switch 10 is pressed. In addition, when the indicator of the successive photo mode switch 13 is switched to the position where the [H] is printed (in other words, switched to the H mode), 30 frames per second (in other words, high speed successive mode) of photography are performed during the time that the release switch 10 is pressed.

Figure 3:
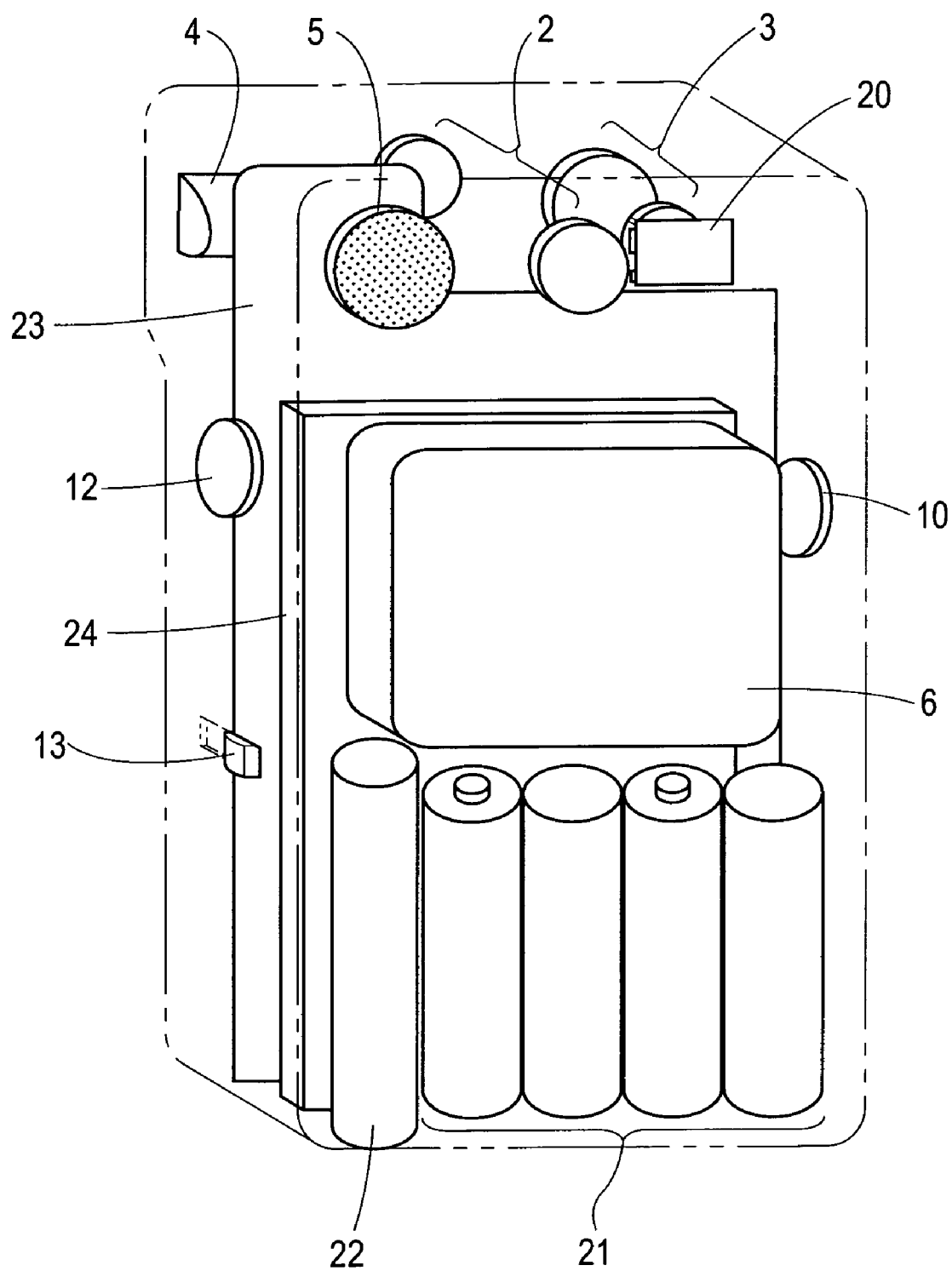
FIG. 3 shows the inner components of the electronic camera shown in FIG. 1 and FIG. 2.

Next, some of the inner components of the electronic camera 1 will be explained referring to FIG. 3. A CCD 20 is provided on the X2 side of the photographic lens 3. A photo-image of the object is formed through the photographic lens on the CCD 20, the photo-image undergoing photoelectric conversion to an electric signal therein.

Batteries (e.g., four dry cell type 3 batteries) 21 are arranged vertically beneath the LCD. The electrical power generated by these batteries 21 is supplied to the various parts of the apparatus. Further, the condenser 22, which accumulates the electric load for emitting the light emitting component 4, is arranged vertically next to the batteries 21.

The various types of control circuits for controlling each component of the electronic camera 1 are formed on a circuit board 23. In addition, in between the LCD 6 and the batteries 21, a removable memory card 24 (which functions as a recording means) is arranged. The various types of information input into the electronic camera 1 is recorded on a predetermined area of the memory card 24.

Although in the present embodiment the memory card 24 is removable, it may also be arranged so that the memory is on the circuit board 23 thereby recording each type of information into this memory. Furthermore, the device may also be set up so as to allow the various types of information recorded in the memory (memory card 24) to be output to an external personal computer through an interface, not shown in the figure.

Figure 4:
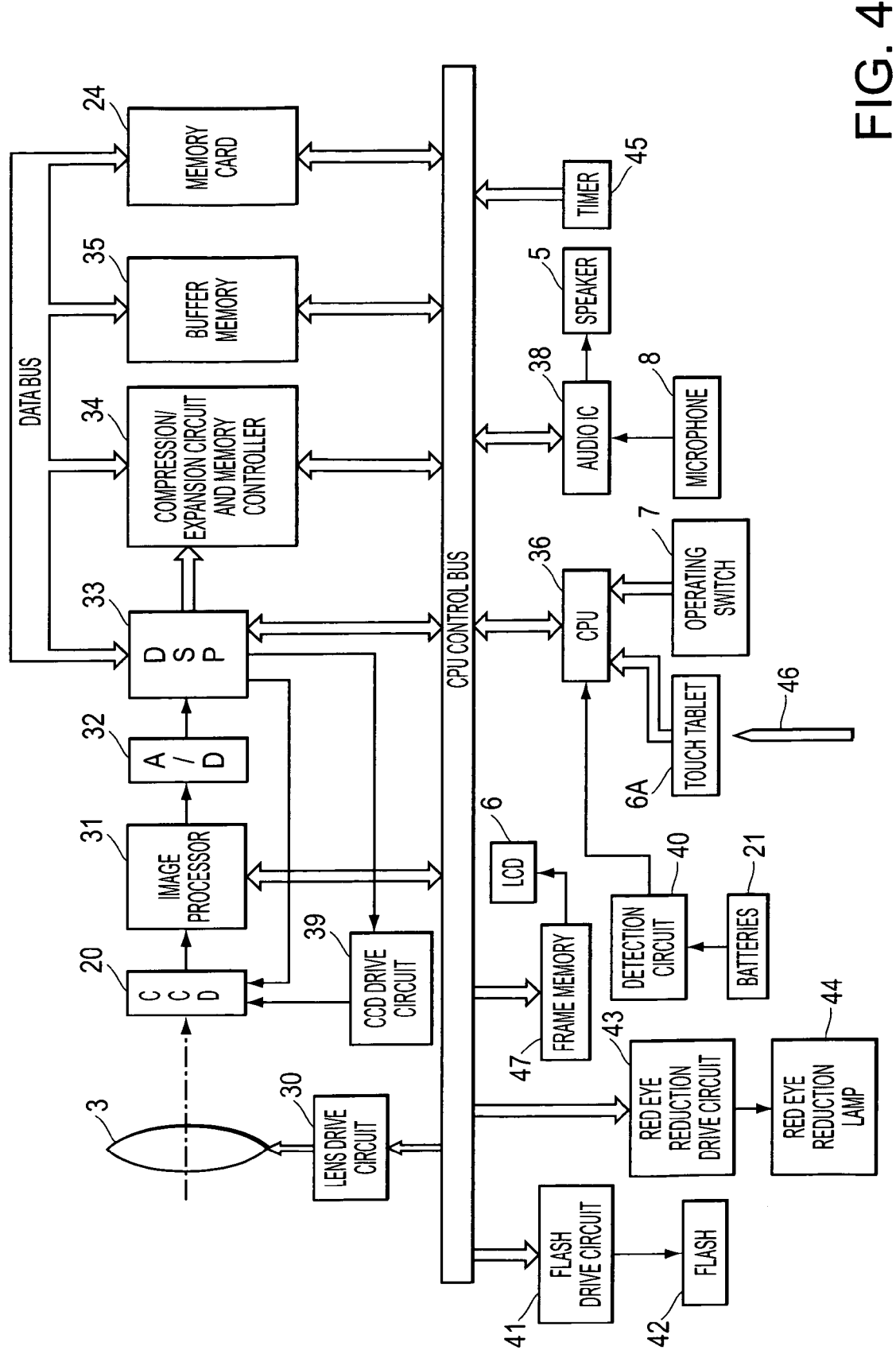
FIG. 4 is a block diagram of the electronic camera shown in FIG. 1 and FIG. 2.

The electrical composition of the inner components of the electronic camera 1 of the first embodiment is explained hereafter, with reference to FIG. 4. The lens drive circuit 30 is controlled by the CPU 36 (which also functions as the thumbnail image generating means and control means). The photographic lens 3 is moved in the optical axis direction and auto-focus is executed under control by CPU 36. The CCD 20, which includes a plurality of pixels, performs the photoelectric conversion of the photo-image formed at each pixel into a picture image signal (electronic signal). The CCD drive circuit 39 is controlled by the digital signal processor (hereafter referred to as the DSP) 33 so as to drive the CCD 20.

The image processor 31, performs at a predetermined timing, correlated double sampling of the image signals that are photoelectrically converted by the CCD 20. By way of an auto-gain controller, image processor 31 ensures that the signal value of the image signals that are sampled are at their optimum level. The analog/digital converter (hereafter referred to as the A/D converter) 32 converts the sampled image signal from the image processor 31 to a digital signal and then supplies it to the DSP 33.

The DSP 33 performs a prescribed process, to be described hereafter, on the digitized picture image signal. DSP 33 then supplies the signal to the compression/expansion circuit and memory controller (hereafter referred to as the compression/expansion circuit) 34. The compression/expansion circuit 34 compresses the picture image signal (hereafter referred to simply as the image data) that is supplied from the DSP 33, and stores it in a predetermined area (photo-image recording area) of the memory card 24.

The timer 45 includes the photographic date and time information into an information header for the image data, which is recorded in the photo-image recording area of the memory card 24. (In other words, the photographic date and time data is attached to (i.e., correlated to) the image data recorded in the photo-image recording area of the memory card 24.)

The microphone 8 inputs audio (sound), converts it to a corresponding electric signal, and then supplies it to the audio IC (integrated circuit) 38. The audio IC 38, in addition to A/D converting the input audio signal, performs compression processing by way of, for example, the ADPCM (Adaptive Differential Pulse Code Modulation) process, and then supplies it to the CPU 36 through the CPU control bus.

The CPU 36 records the digitized and compressed audio sound data to a prescribed area (audio recording area) of the memory card 24 through the CPU control bus. In addition, at that time, the data of the sound recording time and date is recorded to the audio recording area of the memory card 24 as audio header information.

When the predetermined position of the touch tablet 6A is contacted by the pen-shaped indicator (hereafter abbreviated as pen) 46, which is operated by the user, the CPU 36 reads the X-Y coordinates of the position where the touch tablet 6A is contacted, and the coordinate data (hereafter described as line picture information) is stored in the buffer memory 35 (which functions as a secondary recording means). The CPU 36 records the line picture information that is stored in the buffer memory 35, as well as the header information of the line picture information input date and time, to the line picture information area.

The frame memory 47 (which functions as an output means) records the line picture data that is sent through the CPU control bus thereby displaying it to the LCD 6. However, the photo-image data that previously was subjected to the compression process is temporarily input into the compression/expansion circuit 34, where it is expanded (decompressed) prior to being supplied to the frame memory 47.

The audio data output from the memory card 24 undergoes digital/analog conversion (hereafter referred to as D/A conversion) by way of the audio IC 38, and after being converted to an analog signal, is supplied to the speaker 5 where it is output as audio sound.

The flash lamp (or strobe) drive circuit 41 is controlled by the CPU 36 so as to drive the flash lamp 42, which is provided within the light emitting component 4. In addition, the red-eye reduction (RER) lamp drive circuit 43 is controlled by the CPU 36 so as to drive the red-eye reduction lamp 44, which is provided within the light emitting component 4. The red-eye reduction lamp 44 is illuminated directly prior to the lighting of the flash lamp 42, causing the pupil of the eye of the human photographic subject to contract, thereby reducing the so-called red-eye phenomenon in which the eye of the human subject within the photographed picture image appears red.

The detection circuit 40 converts the voltage of the batteries 21 into a corresponding digital signal, and then supplies it to the CPU 36. The CPU 36 can detect the remaining amount of electrical power in the batteries 21 by way of the digital signal supplied from the detection circuit 40.

Next, various operations of the electronic camera 1 of the present embodiment will be explained.

First, the input and output processes of the audio information of the present device will be described.

After turning ON the power to the electronic camera 1 by operating the power switch 11, when the sound recording switch 12 provided on the Y2 side is pressed, the audio sound recording process (the input process for audio information) is initiated. The audio information is input through the microphone 8, and after undergoing A/D conversion and compression processing by way of the audio IC 38, is supplied to the CPU 36.

The audio sound that is supplied to the CPU 36 is supplied to the memory card 24 where it is recorded to the audio recording area. At this time, the sound record date and time data is recorded as header information to the audio recording area of the memory card 24. This type of operation is performed continuously while the sound recording switch 12 is being pressed. While the audio recorded in this case has been compressed by the ADPCM method, other compression methods may also be used.

Next, the operation at the time of photographing an object by way of the present embodiment will be described.

First, an explanation will be provided concerning the case when the successive photo mode switch 13 arranged on the Y2 side is switched to the S mode (the mode that photographs only one frame at a time). Initially, the power to the electronic camera 1 is turned ON by the user operating the power switch 11 arranged on the Y1 side. The photographic object is confirmed through the viewfinder 2, and when the release switch 10 arranged on the Y1 side is pressed, the photography process of the object is initiated.

The photo-image of the photographic object that was observed through the viewfinder 2 is collected and image formation occurs on the CCD 20, which includes a plurality of pixels. The photo-image of the object formed on the CCD 20 is photo-electrically converted to a picture image signal at each pixel where a sampling is provided by the image processor 31. The picture image signal sampled by the image processor 31 is supplied to the A/D converter 32 where it is digitized and then output to the DSP 33.

The DSP 33, carries out a process that generates color-difference signals from the RGB (Red, Green, Blue) signal, and performs a gamma process which is a non-linear process. The compression/expansion circuit 34 compresses the picture image data that is supplied from the DSP 33 according to the JPEG (Joint Photographic Experts Group) method, which combines discrete cosine transformation, quantization and Huffman encoding. Thus, the compressed image is recorded to the photo-image recording area of the memory card 24. At this time, the photography date and time date is recorded to the photo-image recording area of the memory card 24 as the header information of the photo-image data.

When the successive photo mode switch 13 is switched to the S mode, only one frame is photographed even if the release switch 10 is pressed continuously (i.e., held down for a long time).

Second, an explanation will be provided for the case when the successive photo mode switch 13 is switched to the L mode (the mode that photographs successively 8 frames per second). By operating the power switch 11, the power is turned ON to the electronic camera 1, and when the release switch 10 is pressed, the photography process of the object is initiated.

The photo-image of the photographic object that was observed through the viewfinder 2 is collected and image formation occurs on the CCD 20. The photo-image of the object formed on the CCD 20 is photo-electrically converted to a picture image signal where a sampling at a ratio of 8 times per 1 second is provided by the image processor 31. Further, at this time, the image processor 31 samples ¼ of the total number of pixels of the CCD 20.

In other words, the image processor 31, as shown in FIG. 5, divides the pixels of the CCD 20, which are arranged in a matrix, into areas (fundamental units) of 2×2 pixels (i.e. 4 pixels). A sampling is taken of the picture image signal for 1 pixel that is arranged in a predetermined position of each area, and the remaining 3 pixels are ignored (this is known as a thinning process). For example, at the time of the first sampling (the first frame), the pixel a of the top left of each fundamental unit is selected for sampling while the remaining pixels b, c and d are ignored. At the time of the second sampling (the second frame), the pixel b of the top right of each fundamental unit is selected for sampling while the remaining pixels a, c and d are ignored. Thereafter, from the third and fourth times of sampling, the pixel c of the bottom left and the pixel d of the bottom right are selected for sampling respectively in turn, and the remaining pixels are ignored. In other words, each pixel is selected for sampling once in four sampling times.

The picture image signal that is sampled by the image processor 31 (i.e. the picture image signal of ¼ of the pixels from the total number of pixels on the CCD 20) is supplied to the A/D converter 32 where it is digitized and output to the DSP 33.

The DSP 33 carries out the aforementioned process on the digitized picture image signal before outputting it to the compression/expansion circuit 34. The compression/expansion circuit 34 carries out the compression process of the picture image signal based on the JPEG method, for example, and then records it to the photo-image recording area of the memory card 24 through the CPU control bus. At this time, the photography date and time data is recorded to the photo-image recording area of the memory card 24 as header information of the photo-image data.

Third, an explanation will be provided for the case when the successive photo mode switch 13 is switched to the H mode (the mode that photographs successively 30 frames per second). By operating the power switch 11, the power is turned ON to the electronic camera 1, and when the release switch 10 is pressed, the photography process of the object is initiated.

The photo-image of the photographic object that was observed through the viewfinder 2 is collected and image formation occurs on the CCD 20. The photo-image of the object formed on the CCD 20 is photo-electrically converted to a picture image signal where a sampling at a ratio of 30 times per 1 second is provided by the image processor 31. Further, at this time, the image processor 31 samples ⅑ of the total number of pixels of the CCD 20.

In other words, the image processor 31, as shown in FIG. 6, divides the pixels of the CCD 20, which are arranged in a matrix, into fundamental units of 3×3 pixels whereby a sampling is taken at a rate of 30 times per 1 second from each area of the picture image electronic signal for 1 pixel that is arranged in a predetermined position, and the remaining 8 pixels are ignored. For example, at the time of the first sampling (the first frame), the pixel a of the top left of each area is selected for sampling while the remaining pixels b through i are ignored. At the time of the second sampling (the second frame), the pixel b arranged to the immediate right of pixel a is selected for sampling while the remaining pixels a and c through i are ignored. Thereafter, from the third and fourth times of sampling, the pixel c and the pixel d and so forth are selected for sampling respectively in turn, and the remaining pixels are ignored. In other words, each pixel is selected for sampling every 9 frames.

The picture image signal sampled by the image processor 31 (i.e. the picture image signal of ⅑ of the pixels from the total number of pixels on the CCD 20) is supplied to the A/D converter 32 where it is digitized and output to the DSP 33.

The DSP 33 carries out the aforementioned process on the digitized picture image signal before outputting it to the compression/expansion circuit 34. The compression/expansion circuit 34, after carrying out the compression process to the picture image signal according to the JPEG method, for example, then adds the photography date and time that is supplied from the timer 45 as header information and records it to the photo-image recording area of the memory card 24.

Next, an explanation will be provided of the case when two dimensional line picture information (pen input information) is input from the touch tablet 6A. When the touch tablet 6A is pressed with the point of the pen 46, the X-Y coordinates of the point of contact is supplied to the CPU 36. These X-Y coordinates are stored in the buffer memory 35, and the data is written to the location that corresponds to each point of the X-Y coordinates that are within the frame memory 47. Accordingly, the data is displayed on the LCD 6.

As described above, since the touch tablet 6A, which is provided on the surface of the LCD 6, is formed out of transparent materials, the user can view the points (i.e the points of the positions that are pressed upon by the pen tip of the pen 46) that are displayed on the LCD 6. This makes it seem as if there is direct pen input on the LCD 6. Further, when moving the pen 46 on the touch tablet 6A, a line which corresponds to the movement of the pen 46 is depicted on the LCD 6. In addition, if the pen 46 is moved intermittently on the touch tablet 6A, a broken line corresponding to the movement of the pen 46 is displayed on the LCD 6. Thus, the user has the ability to input desired line picture information such as drawings or letter characters from the touch tablet 6A.

When the photo-image is displayed on the LCD, the line picture information can be input by the pen 46 thereby causing the line picture information to integrate with the photo-image information in the frame memory 47, thereby allowing it to be displayed on the LCD 6. The user can select the color of the line picture indicated on the LCD 6 from among the colors of black, white, red, blue and so forth by operating a color selection switch, not shown in the figure.

After inputting the line picture information to the touch tablet 6A by way of the pen 46, when the execution key 7B is pressed, the line picture information stored in the buffer memory 35 is supplied to the memory card 24 through the CPU control bus along with the header information of the input date and time, thereby being recorded to the line picture information recording area.

The line picture information that is recorded in the memory card 24 includes information that has undergone a compression process. Since the line picture information that is input into the touch tablet 6A includes mainly information having a high spatial frequency content, when performing the compression process by way of the aforementioned JPEG method used in the compression of the photo-image, the compression efficiency is poor, because the information amount cannot be reduced, the time required for compression and expansion becomes longer. In addition, since compression with the JPEG method is lossey, it is not conducive to the compression of line picture information which has only a small amount of information (this is due to the gathering that accompanies the lack of information and the blurring that stands out when expanding and displaying on the LCD 6).

Therefore, in the present embodiment, line picture information is compressed by the run-length method used in faxes and so forth. The run-length method is a method which scans the line picture surface in a horizontal direction and encodes each length of continuous color information for each color such as black, white, red, blue and so forth, as well as each length of continuous non-information (the lengths where there are no pen inputs) thereby allowing the line picture to be compressed.

By using the run-length method, effective compression of line picture information becomes possible. It also becomes possible to control the lack of information even when expanding the line picture information that has been compressed. When the amount of line picture information is comparatively small, it can also be set so as to not compress.

As described above, in the case where the photo-image is displayed on the LCD 6, when performing pen input, the photo-image data and the line picture data of the pen input are integrated in the frame memory 47. The integrated image of the photo-image and the line picture is displayed on the LCD 6. Meanwhile, the photo image data is recorded to the photo image recording area and the line information is recorded to the line picture information recording area of the memory card 24. In this way, since two forms of information are recorded in respectively different areas, the user can erase any one of the picture images (for example the line picture) from the integrated images of the photo-image and the line picture. Additionally, the user can also compress the various image information with individual (different) compression methods.

Figure 7:
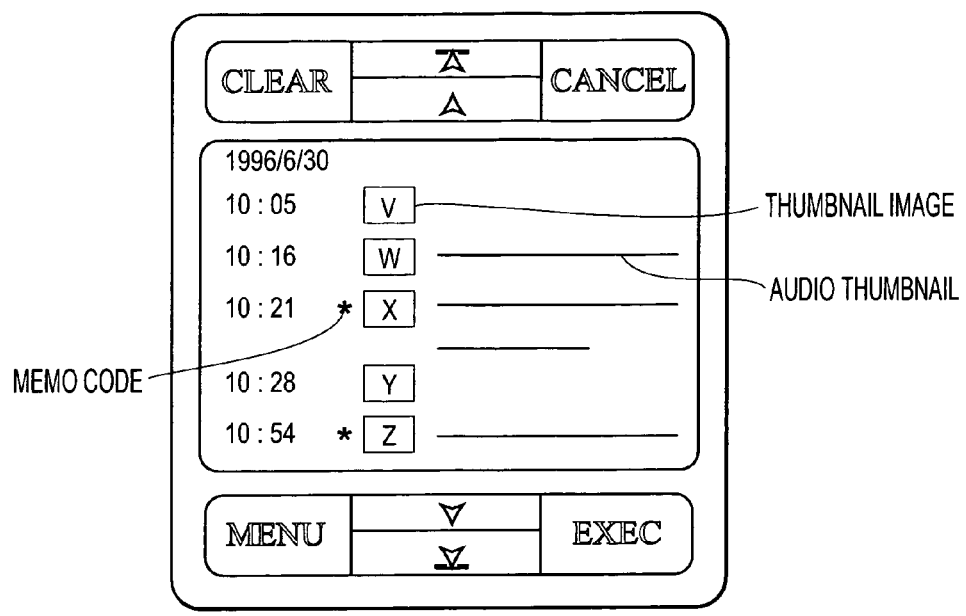
FIG. 7 is one example of the display screen when reproducing the recorded information.

When setting the camera to the reproduction mode after recording data to the audio recording area, to the photo-image recording area, or to the line picture information recording area of the memory card 24, as shown in FIG. 7, a predetermined display is given on the LCD 6. With the display example given in FIG. 7, the date that the information is recorded (the recording date) (in this case Jun. 30, 1996) is displayed on the upper portion of the screen, and the time of recording the information that is recorded on that recording date is displayed in the left-most edge of the screen.

A thumbnail image is displayed to the adjoining right of the recording time. This thumbnail image is created by thinning (reducing) the bitmap data for each image of the photo-image data recorded to the memory card 24. The other information displayed with this display is the information included with the photo-image. In this display example, photo-image information is included in each of the entries. When the photo-image was photographed in the L mode or the H mode, one or more predetermined images (for example the first image) is selected from among the plurality of images, and a thumbnail image is created for the predetermined image.

The memo-code "*" indicates that a prescribed memo is recorded as line picture data.

The audio thumbnail is displayed to the right side of the display area of the thumbnail image, and a bar (line) indicating the length corresponding to the length of the recorded time is displayed (when there is no audio information input, then the bar is not displayed).

In this display example, the order of display of the thumbnail picture image and the audio thumbnail and so forth is determined by the order (in order of time) in which they were recorded to the memory 24. In other words, in the event that a plurality of information is recorded that cannot be displayed on a single screen, when the display process is performed on this screen, the oldest recorded information will be displayed on the first line, and thereafter, the display will follow in the order of the oldest recording time (photography date and time or audio recording date and time). Furthermore, a description of this type of display method will follow hereafter.

The user can selectively designate the information to be reproduced by pressing one portion of the desired thumbnail of the LCD 6 shown in FIG. 7 with the pen tip of the pen 46. By pressing the execution key 7B shown in FIG. 2 with the pen tip of the pen 46, the user can reproduce the selected information.

For example, when the audio thumbnail displayed on the right side of the "10:16" shown in FIG. 7 is pressed by the pen 46, the CPU 36 reads the audio data corresponding to the selected sound recording date and time (10:16) from the memory card 24 and supplies it to the audio IC 38. The audio IC 38 carries out the expansion process to the audio data (the compressed audio data), and after carrying out the D/A conversion and converting it to an analog signal, it is supplied to the speaker 5. The speaker 5 converts the supplied analog signal to audio sound and outputs it. When the earphones, not shown in the figure, are connected to the ear-jack 9, the sound is not reproduced through the speaker 5, but is instead reproduced through the earphones.

When reproducing photo-image data recorded in the memory card 24, the user selects the information by pressing the desired thumbnail image with the pen tip of the pen 46, and accordingly, the selected information can be reproduced by pressing the execution key 7B.

The CPU 36 reads the photo-image data corresponding to the selected photograph date and time from the memory card 24, and it is supplied to the compression/expansion circuit 34. The photo-image data (the compressed photo-image data) supplied to the compression/expansion circuit 34 is expanded (decompressed) there and output again to the CPU 36. The CPU 36, after temporarily storing the photo-image data in the frame memory 47 as bitmap data, displays it on the LCD 6.

The picture image photographed in the S mode is displayed on the LCD 6 as a static picture image. It goes without saying that this static picture image is the reproduced image of the picture image signal of all of the pixels of the CCD 20.

The picture images photographed in the L mode are displayed successively on the LCD 6 at the rate of 8 frames per second. At this time, the number of pixels displayed in each frame is ¼ of the total number of pixels of the CCD 20.

Since human vision is sensitive to the deterioration of resolution of static picture images, when thinning the pixels of a static picture image, the user easily detects resolution deterioration. However, with the L mode where the picture images of 8 frames are reproduced per second, the number of pixels for each frame becomes ¼th of the total number of pixels of the CCD. However, as explained above, since the pixels for 8 frames per one second are reproduced, the information amount per second becomes twice that of a static picture image.

In other words, if the number of pixels for 1 frame of a picture image photographed in the S mode were 1, then the number of pixels for 1 frame of a picture image photographed in the L mode would become ¼. When a picture image (static picture image) that is photographed in the S mode is displayed on the LCD 6, the amount of information entering the human eye in 1 second becomes 1 (=(number of pixels 1)×(number of frames 1)). Meanwhile, when a picture image that is photographed in the L mode is displayed on the LCD 6, the amount of information that enters the human eye in one second becomes 2 (=(number of pixels ¼)×(number of frames 8)). In other words, twice as much information as compared to a static picture image enters the human eye. Accordingly, even if the number if pixels within 1 frame were to be ¼th, when reproduced, the user does not notice the deterioration of the picture image quality.

Additionally, with the present embodiment, a sampling is taken of different pixels for each frame, and since those pixels from the sampling are displayed on the LCD 6, the after-image effect of the human eye occurs. Accordingly, even if ¾ of the pixels per frame are thinned, the user can view the picture images photographed in the L mode that is displayed on the LCD 6 without noticing the deterioration of the picture image quality.

In addition, images photographed in the H mode are displayed successively at a rate of 30 frames per 1 second. At this time, the number of pixels displayed for each frame are ⅛ of the total number of pixels in the CCD 20. However, for the same reason as in the case of the L mode, the user can view the picture images photographed in the H mode that are displayed on the LCD 6 without noticing the deterioration of the picture image quality.

In the present embodiment, when photographing an object in the L mode and in the H mode, since the image processor 31 thins the pixels of the CCD 20 to the extent that the deterioration of the picture image quality is not noticed when reproduced, the load of the DSP 33 and the compression/expansion circuit 34 can be reduced, enabling these components to be operated at a low speed and low voltage. In addition, in this way, low cost and low energy consumption of the device can be made possible.

Next, the display and creation method of thumbnail images applicable to the present invention will be described.

Figure 8:
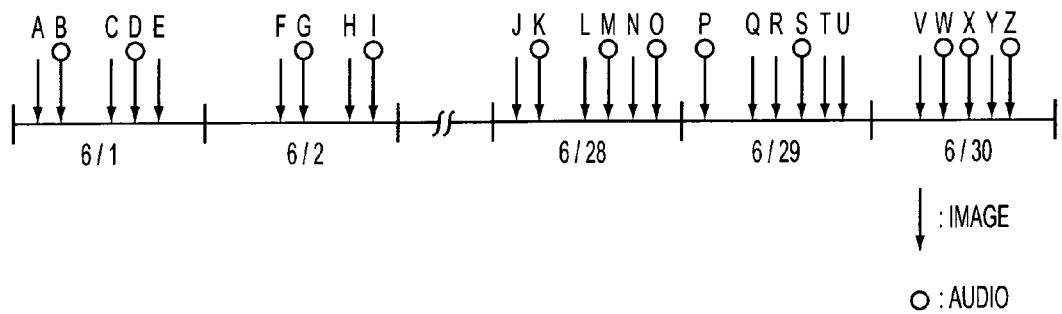
FIG. 8 shows one example of the audio and image recorded history.

FIG. 8 shows the history of picture image and audio recording. In this figure, the arrows pointing downward indicate that a picture image has been photographed at the point in time indicated by the arrow. The circle mark (0) attached to the upper end of an arrow indicates that audio has been recorded at the same time. These images and sounds are stored respectively in the photo-image recording area and the audio recording area.

Figure 9:
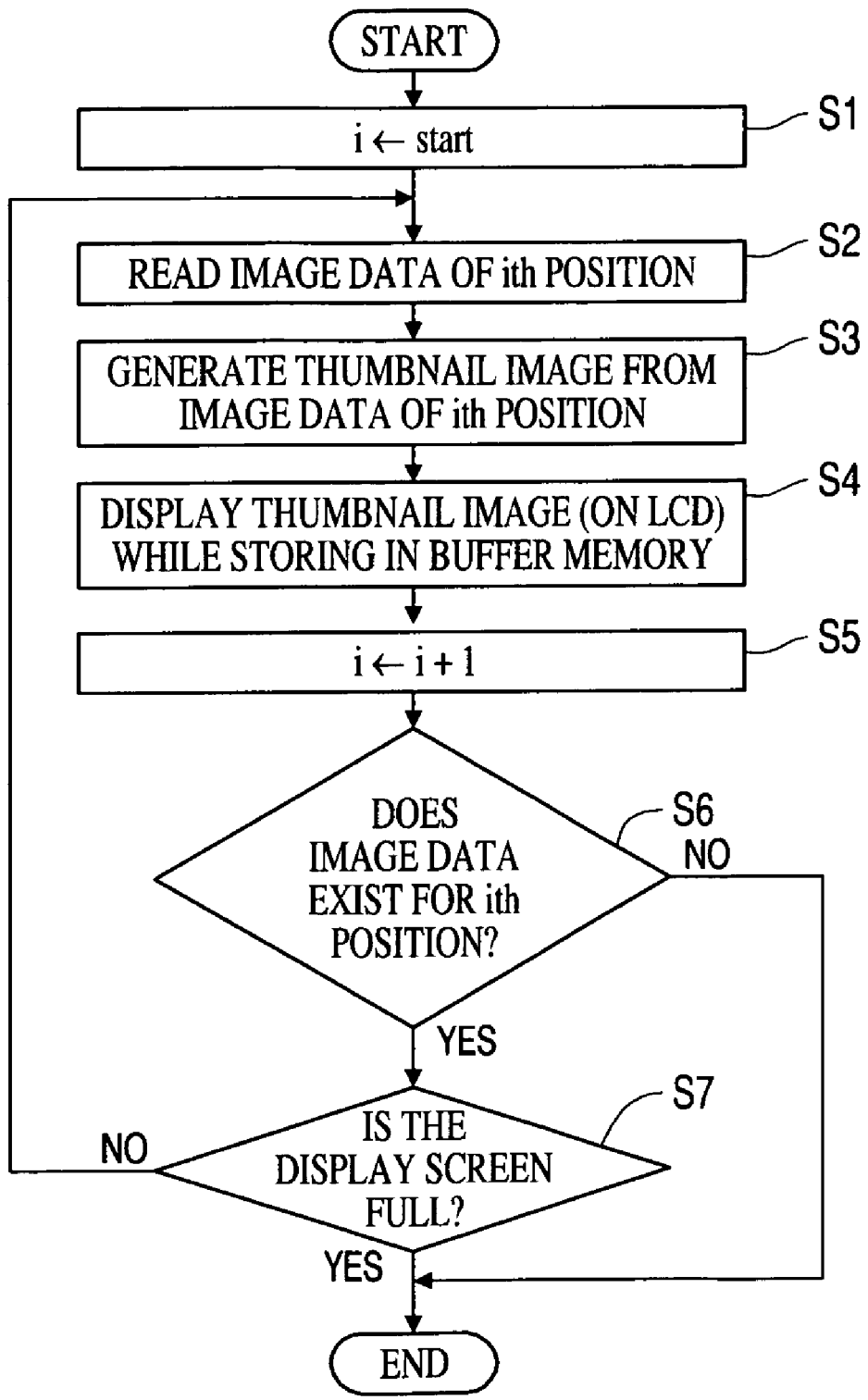
FIG. 9 is a flow chart describing one example of a process that creates and displays one screen worth of thumbnail images.

FIG. 9 is a flow chart that explains an example of the process that occurs at the time when creating a thumbnail image from a picture image recorded in the memory card 24 and displaying it as shown in FIG. 7.

This process is executed when the electronic camera 1 is in the reproduction mode. In other words, when the reproduction mode is selected from among the menu, which is not shown in the figure, when the menu key 7A is pressed by the pen 46, the CPU 36 executes the process of step S1.

The CPU 36, in step S1, assigns to the variable i the content of the variable "START." The value of the variable START depends on the numbering (the number indicating the order in which items were recorded into the memory card 24) of the items stored in the memory card 24. In the display example shown in FIG. 7, since the picture image V, which was photographed on June 30th, is the photo-image that will be processed first (because it was the first image recorded on June 30), the ordinal number 22 is assigned to the variable "START." That is, V is the twenty-second item stored in memory card 24 (A is the first item and Z is the twenty-sixth item in this example—see FIG. 8). Through the process of step S1, the value 22 will be assigned to the variable i.

In step S2, the CPU 36 reads the photo-image data which is in the ith position from the memory card 24. Then, flow proceeds to step S3 where the photo-image in the ith position is reduced by a predetermined ratio, and the thumbnail image is generated.

In step S4, the CPU 36, while storing the thumbnail image in the buffer memory 35, displays it on the LCD 6. As described above, since i=22, the CPU reads the photo-image data in the 22nd position that is recorded in the memory card 24, and after reducing it by a predetermined ratio, the thumbnail image is created. Furthermore, while storing the obtained thumbnail image to the buffer memory 35, it is displayed on the LCD 6 along with the photography date and time. The result being, as shown in FIG. 7, that the thumbnail image V corresponding to the recording time (10:05) is displayed.

Next, the CPU 36, continues to step S5, where it increases the value of variable i by 1. In step S6, a determination is made as to whether photo-image data in the ith position exists. If it is determined to be (YES) that the photo-image data in the ith position exists, then flow proceeds to step S7. If it is determined to be (NO) that the photo-image data in the ith position does not exist, then the process is completed (END).

In step S7, a determination is made as to whether the screen is full. In other words, a determination is made as to whether there exists sufficient space to display a new thumbnail image on the LCD 6. The result being that, if it is determined to be (YES) that the screen is full, then the process is completed (END). However, if it is determined to be (NO) that the screen is not full, then flow returns to step S2 and repeats a similar process.

At this time, since i=22, the result of the process in step S5 is that it now becomes i=23, and in step S6, it is determined to be (YES) that the photo-image data in the 23rd position exists, and thus flow proceeds to step S7. In step S7, if the screen is still not yet full, a judgment of NO is given, and flow returns to step S2 thereby repeating a similar process.

Furthermore, the process as described above is executed for the photo-image data V through Z, and the result being, as shown in FIG. 7, that the thumbnail images corresponding to the photo-image data of each of these images are displayed. After completing the process for the photo-image data Z, in step S6, it is determined to be (NO) that photo-image data in the 27th position does not exist thereby ending the process (END).

Furthermore, with the above explanation, in the interest of simplification, the explanation of the display process for the audio thumbnail and the memo-codes have been omitted. In addition, with the above process, START was the point of initiation with creation of the thumbnail image in the order of photography (the order from left to right in FIG. 8). However, it is also, for example, possible to use the point of termination (e.g., entry Z) as the initiation point for the creation of thumbnail images and to proceed in the order from the newest photography date (the order of right to left in FIG. 8).

Figure 10:
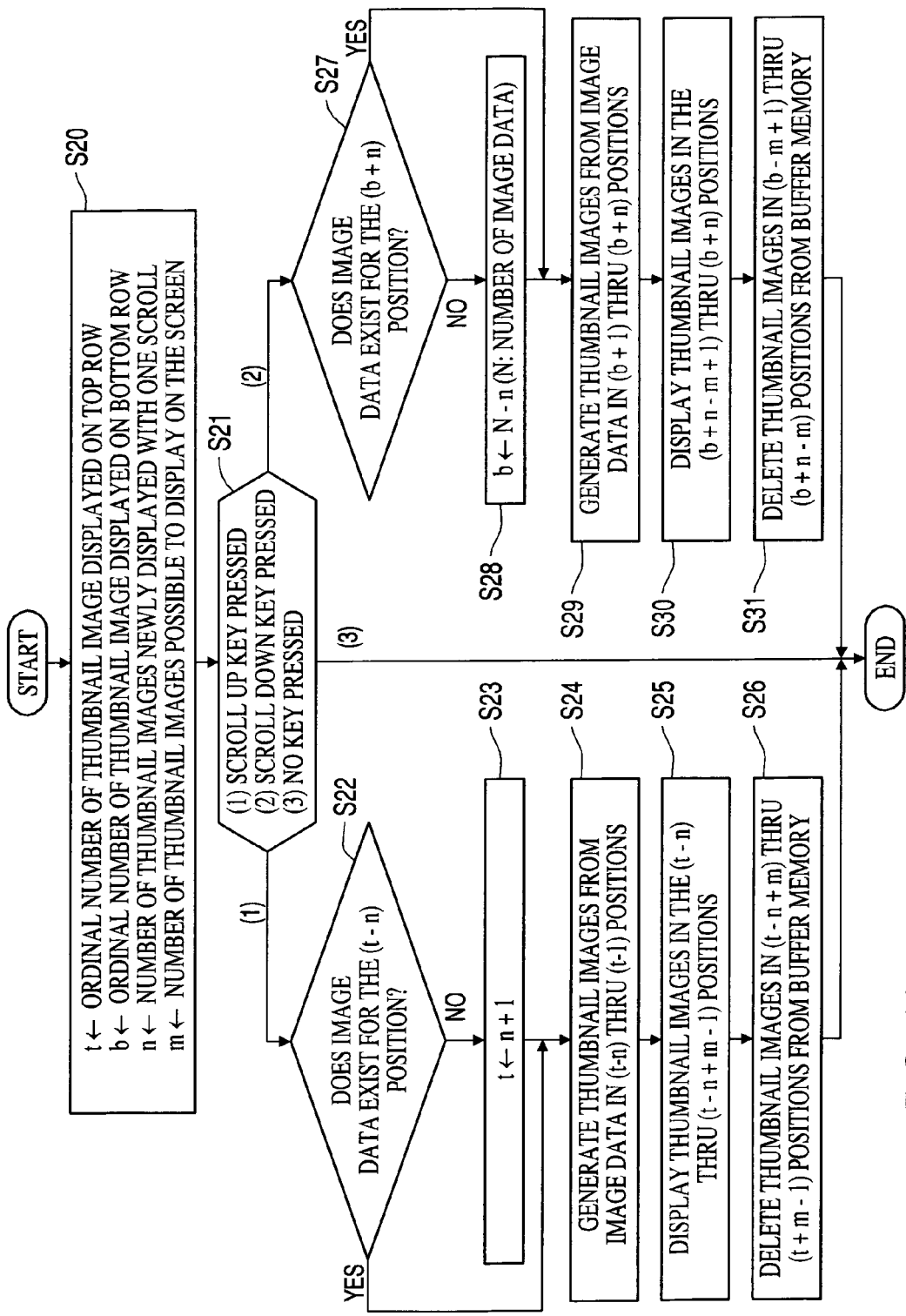
FIG. 10 is a flow chart describing one example of a process that executes scrolling for the display screen displayed by the process in FIG. 9.

Next, referring to the display screen shown in FIG. 7, a description of the process for the case when the scroll key 7E is pressed will be given with reference to FIG. 10.

This process, for example, is executed following the completion of the process shown in FIG. 9. The CPU 36, in step S20, assigns to the variable t the number (hereafter, this will be abbreviated as the number of the thumbnail image(s)) of the photo-image that corresponds to the thumbnail image currently displayed at the upper-most line of the screen. The variable b is assigned the number of the thumbnail image that is currently displayed at the bottom-most line of the screen. The variable n is assigned the number of thumbnail images newly displayed by one scroll. For example, when making the screen scroll 1 line at a time, the number 1 is assigned to the variable n. In addition, the variable m is assigned the number of thumbnail images capable of being displayed on the screen at one time.

In step S21, the CPU determines whether the scroll key 7E has been pressed. If the CPU 36 determines that the line scroll up key 7E-A, which is for scrolling line units in the upward direction (the upper direction in FIG. 7), has been pressed (1), then flow proceeds to step S22. If it is determined that the line scroll down key 7E-B, which is for scrolling line units in the downward direction (the lower direction in FIG. 7), has been pressed (2), flow proceeds to step S27. When the CPU 36 determines that the scroll key 7E has not been pressed (3), then the process is completed (END).

At this time, for example, when the line scroll up key 7E-A for scrolling in the upward direction is pressed, flow proceeds to step S22. In step S22, a determination is made as to whether the photo-image data in the (t−n) position exists. In other words, the number of thumbnail images newly displayed by 1 scroll are subtracted from the ordinal number of the thumbnail image currently displayed on the upper-most line of the screen. Thus, a determination is made as to whether the picture image data of the number corresponding to the obtained value exists. When the result of step S22 is determined to be (YES) that the photo-image data in the (t−n) position exists, then flow skips the process in step S23 and proceeds directly to step S24. When the result of step S22 is determined to be (NO) that the photo-image data in the (t−n) position does not exist, then flow proceeds to step S23.

In step S23, since the thumbnail image newly displayed on the upper-most line of the screen subsequent to executing the scroll becomes that which corresponds to the photo-image data that is in the first position, the value (n+1) is substituted for the variable t. In other words, when the value (t−n)≦0, the corresponding photo-image data does not exist, and therefore, at the processes below step S24, the value of (n+1) is substituted for the variable t so that normal processes can be executed. The result being that, for example, at the process of step S24, to be explained hereafter, the thumbnail image that is created has the photo-image data in the first (=t−n=(n+1)−n=1) position as its head.

In step S24, the thumbnail images are created from the photo-image data of the (t−n) through the (t−1) positions, and then stored in the buffer memory 35.

At this time, n=2 (indicating that 2 lines will be scrolled at a time), and, as shown in FIG. 7, when t=22, b=26, and m=5, the photo-image in the 20th (=t−n=22−2) position exists, therefore, (YES) is determined in step S22 and flow proceeds to steps S24. Furthermore, in step S24, the thumbnail images are created from the photo-image data in the 20th (=t−n=22−2) position and the 21st (=t−1=22−1) position, and is then stored in the buffer memory 35. These thumbnail images are those that are newly displayed on the screen as a result of the scroll operation.

Figure 11:
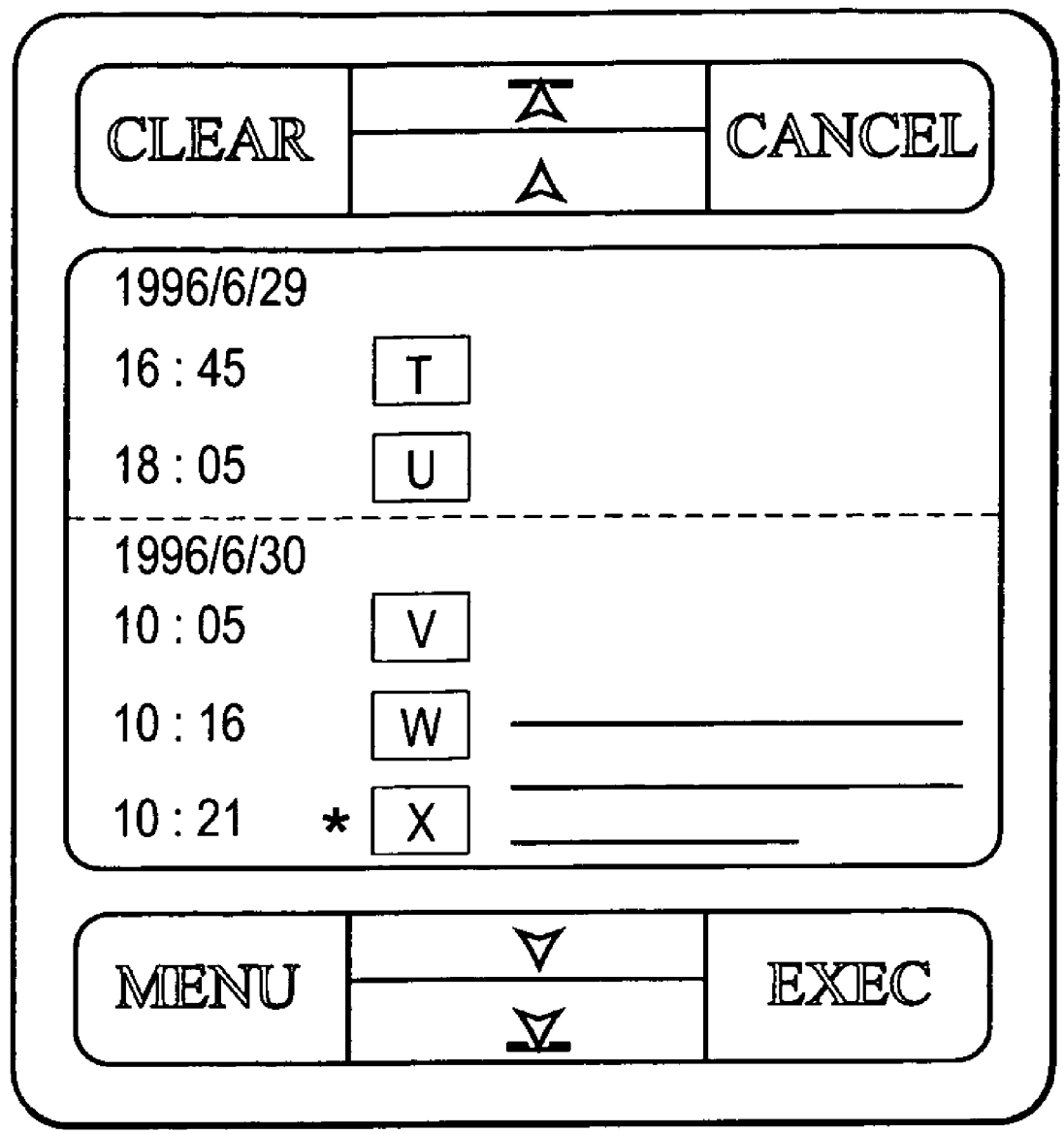
FIG. 11 shows one example of the display subsequent to executing scrolling by the process shown in FIG. 10.

In step S25, the thumbnail images in the (t−n) through the (t−n+m−1) positions are displayed. Further, flow proceeds to step S26 where the thumbnail images in the (t−n+m) through the (t+m−1) positions are deleted from the buffer memory 35, and the process is completed (END). At this time, because t=22 as described above, in the process in step S25, the thumbnail images in the 20th (=t−n=22−2) position through the 24th (=t−n+m−1=22−2+5−1) position are displayed on the LCD 6 as shown in FIG. 11. In other words, the thumbnail images in the 20th (photo-image T) position and 21st (photo-image U) position, which are newly stored in the buffer memory 35, and the thumbnail images in the 22nd through 24th positions which were stored previously, are all displayed on the LCD 6.

In step S26, the thumbnail images in the 25th (=t−n+m=22−2+5) position and the 26th (=t+m−1=22+5−1) position are deleted from the buffer memory 35, and the process is completed (END). In other words, the thumbnail images in the 25th position and the 26th position are those that are deleted from the screen due to the scrolling, and therefore, these thumbnail images are deleted from the buffer memory 35.

Next, starting in step S21, a description will be provided of the case when the line scroll down key 7E-B is pressed. In step S21, when it is determined that the line scroll down key 7E-B has been pressed (2), flow proceeds to step S27. In step S27, a determination is made as to whether the photo-image data in the (b+n) position exists. The result being that, if it is determined to be (YES) that the photo-image data in the (b+n) position exists, then flow skips the process of step S28, and proceeds directly to step S29. In addition, if the result of step S27 is determined to be (NO) that the photo-image data in the (b+n) position does not exist, then flow proceeds to step S28.

In step S28, as a result of the scrolling, since the thumbnail image newly displayed at the bottom-most line of the screen is that which corresponds to the last (Nth position) photo-image data, then the value (N−n) is assigned to the variable b. In other words, when the value (b+n)>N, since the corresponding photo-image data does not exist, the value (N−n) is assigned to the variable b. The result being, for example, in the process of step S29 that will be explained hereafter, that the thumbnail image that will be created will have the photo-image data in the Nth (=b+n=(N−n)+n) position as its tail.

In step S29, the thumbnail images are generated from the photo-image data in the (b+1) position through the (b+n) position, and they are stored in the buffer memory 35. At this time, for example, N=26 (referring to FIG. 8), and assume that the thumbnail images in the first through fifth positions are displayed on the screen. In other words, b=5, m=5, and n=2. At this time, when pressing the line scroll down key 7E-B, in step S21, it is determined that the line scroll down key 7E-B has been pressed (2), and flow branches to step S27.

In step S27, since photo-image data in the 7th (=b+n=5+2) position exists, it determines YES and proceeds to step S29. In step S29, the thumbnail image is created from the photo-image data in the 6th (=b+1=5+1) position and the 7th (=b+n=5+2) position, and it is stored to the buffer memory 35.

In step S30, the thumbnail images in the (b+n−m+1) position through the (b+n) position are displayed on the LCD 6. Further, flow proceeds to step S31 where the thumbnail images in the (b−m+1) position through the (b+n−m) position are deleted from the buffer memory 35, and the process is completed (END). At this time, since b=5, in the process of step S30, the thumbnail images in the third (=b+n−m+1=5+2−5+1) position through the seventh (=b+n=5+2) position are displayed. In other words, the screen scrolls downward by 2 lines. In addition, it proceeds to the process of step S31 where the thumbnail images in the first (=b−m+1=5−5+1) position and the second (=b+n−m=5+2−5) position are deleted from the buffer memory 35 and the process is completed (END)

Next, a description will be provided of the process that occurs when NO is determined in step S22 or step S27. When the thumbnail images in the second through sixth positions are displayed on the screen (i.e. when t=2 and m=5), assume that the line scroll up key 7E-A has been pressed. At this time, when n=2 (indicating that 2 rows will be scrolled at a time), the result of step S22, is determined to be (NO) that the photo-image data in the 0th (t−n=2−2) position does not exist, and flow proceeds to step S23. In step S23, the value 3 (=n+1=2+1) is assigned to the variable t. Then flow proceeds to step S24. In step S24, the thumbnail image is created from the photo-image data in the first (=t−n=3−2) position, and then it is stored in the buffer memory 35. Since the thumbnail image in the second position has already been stored in the buffer memory, the process for the photo-image data in the second position will not be executed.

In the process for step S25, the thumbnail images in the first (=t−n=3−2) position through the fifth (=t−n+m−1=3−2+5−1) position are displayed to the LCD 6. Further, in step S26, the thumbnail image in the sixth (=t−n+m=3−2+5) position is deleted from the buffer memory 35. In this example, since the thumbnail image in the seventh (=t+m−1=3+5−1) position is not created, the process to delete the thumbnail image in the seventh position is not executed.

Next, a description will be provided of the process in the case when NO is determined in step S27. When the thumbnail images in the 21st position through the 25th position are displayed on the screen (i.e. when b=25, m=5, and N=26), assume that the line scroll down key 7E-B has been pressed. At this time, when n=2 (indicating that 2 lines will be scrolled at a time), the result of step S27 is determined to be (NO) that the photo-image data in the 27th (=b+n=25+2) position does not exist. Then flow proceeds to step S28.

In step S28, the value 24 (=N−n=26−2) is assigned to the variable b, and flow proceeds to step S29. In step S29, the thumbnail image is created from the photo-image data in the 26th position, and it is stored in the buffer memory 35. In other words, in the process of step S29, the thumbnail images are created from the photo-image data in the 25th (=b+1=24+1) position through the 26th (=b+n=24+2) position. However, since the thumbnail image in the 25th position has already been created, only the thumbnail image in the 26th position is created.

In step S30, the thumbnail images in the 22nd (=b+n−m+1=24+2−5+1) position through the 26th (=b+n=24+2) position are displayed on the LCD 6. In step S31, the thumbnail image of the 21st (=b+n−m=24+2−5) position is deleted from the buffer memory 35. In other words, in the process of step S31, the thumbnail images in the 20th (=b−m+1=24−5+1) position through the 21st (=b+n−m=24+2−5) position are deleted from the buffer memory 35, and since the thumbnail image in the 20th position does not exist, only the thumbnail image in the 21st position will be deleted, and the process is complete (END).

According to the process described above, when the electronic camera 1 is in the reproduction mode, one screen amount of thumbnail images are created, and while being stored in the buffer memory 35, they are displayed on the LCD 6. When these thumbnail images are in the state of being displayed when the scroll key 7E is pressed, thumbnail images to be newly displayed on the screen are created due to the scroll, and while being stored in the buffer memory 35, they are displayed on the LCD 6. In addition, the thumbnail images canceled from the screen as a result of the scroll, are deleted from the buffer memory 35. Accordingly, there is always one screen worth of thumbnail images stored in the buffer memory 35.

In this way, the storage of one screen worth of thumbnail images in the buffer memory 35, for example, alleviates the trouble of creating thumbnail images every time a user returns to the thumbnail display screen after (temporarily) moving to another screen (for example, a screen that reproduces photo-images that correspond to specific thumbnail images).

Moreover, the thumbnail images that are stored in the buffer memory 35 may also be deleted when changing from the reproduction mode to the recording mode.

In the embodiment described above, one screen worth of thumbnail images are created and stored in the buffer memory 35. However, for example, one screen worth of thumbnail images and thumbnail images that are newly displayed when scrolling is executed (for example, thumbnail images of one row worth or one screen worth) may also be created and stored in the buffer memory 35. According to this option, when the scroll key 7E is pressed, the scroll has the ability to be executed very promptly.

Furthermore, in the embodiment described above, an explanation was provided of only the case when scrolling was performed in line units, however, by appropriately selecting the value of the variable n, it is possible to execute scrolling by units of screens. In other words, when the page scroll up key 7E-C or the page scroll down key 7E-D is pressed, the value of the variable m is used instead of the variable n (the number n of thumbnail images newly displayed due to one scroll becomes the number m of the thumbnail images possible to be displayed on one screen), and by executing the process shown in FIG. 10, it becomes possible to execute scrolling by units of pages.

Figure 12:
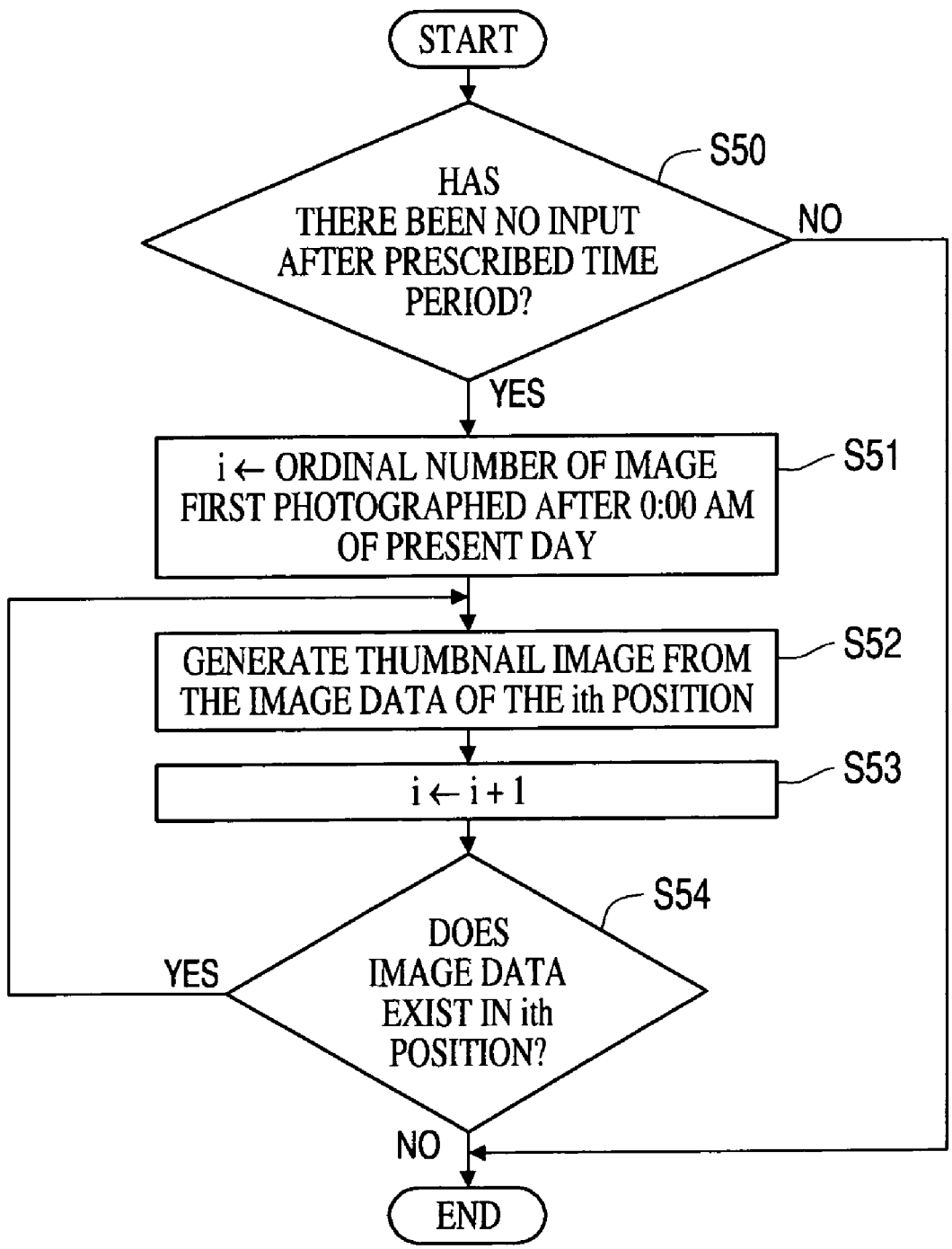
FIG. 12 is a flow chart describing one example of a process that creates a thumbnail image when the input of an image has not been completed within a prescribed time period.

Next, an explanation will be provided hereafter of another embodiment of the present invention. The flow chart shown in FIG. 12 is a flow chart describing a process that creates a thumbnail image when input does not occur after a prescribed time period.

The present process can be executed at every prescribed time period (for example 1 minute) regardless of the selected mode when the power switch 11 of the electronic camera 1 is in the ON position. When the process of step S50 is executed, the CPU 36 determines whether input (of an image or of any command) occurs after the prescribed time period (for example 1 minute). When the result of step S50 is determined to be (YES) that input has not occurred after the prescribed 1 minute time period, then flow proceeds to step S51. When it is determined to be (NO) that input has occurred, the process is completed (END).

In the process of step S51, the (identification) number of the image first photographed after 0:00 AM of that day (the day that the switch was turned on) is assigned to the variable i. In the next process of step S52, the thumbnail image is created from the photo-image data in the ith position, and then it is stored in the buffer memory 35. In step S53, the value of the variable i is increased by 1 increment, and then flow proceeds to step S54.

In step S54, a determination is made as to whether the photo-image data in the ith position exists. The result being that, if it is determined to be (YES) that the photo-image data in the first position exists, then flow returns to step S52 where the similar process is repeated. Further, if it is determined to be (NO) that the photo-image data does not exist, then the process is completed (END).

At this time, if an input has not occurred in more than 1 minute after turning the power switch 11 to the electronic camera 1 to the ON position, it will be determined to be YES in step S50, and it will proceed to step S51. For example, if the date the power switch 11 is turned to the ON position is June 30th, and since the first photographed image taken after 0:00 AM on the morning of June 30th is the photo-image V (refer to FIG. 8), the ordinal number 22 of this photo-image V will be assigned to the variable i in step S51. Proceeding to step S52, the thumbnail image is created from the photo-image data in the 22nd position, and then it is stored in the buffer memory 35. Next, in step S53, the value 22 of the variable i is increased by 1 increment to become i=23.

The result of step S54 is determined to be YES since the photo-image data in the 23rd position exists. Thus, flow returns to step S52 to repeat a similar process. The result being that the thumbnail images for the photo-images in the 22nd position through the 26th position (photo-image V through Z) are created, and then they are stored in the buffer memory 35.

With the embodiment described above, from the time that the temporary processing is initiated until the creation process of the thumbnail image (the processes of steps S52 through S54) is completed, the camera is in a state that will not accept input from the user. At this time, however, it is also possible to allow the user to perform input, upon which the creation process of the thumbnail images will temporarily stop, and when the process for input is completed, the creation process of the thumbnail images will resume. Furthermore, in the embodiment described above, the creation of the thumbnail image is performed in the order from the photo-image with the oldest recorded date. However, it may also be set up so as to create the thumbnail image in the order from the photo-image with the newest recorded date.

Figure 13:
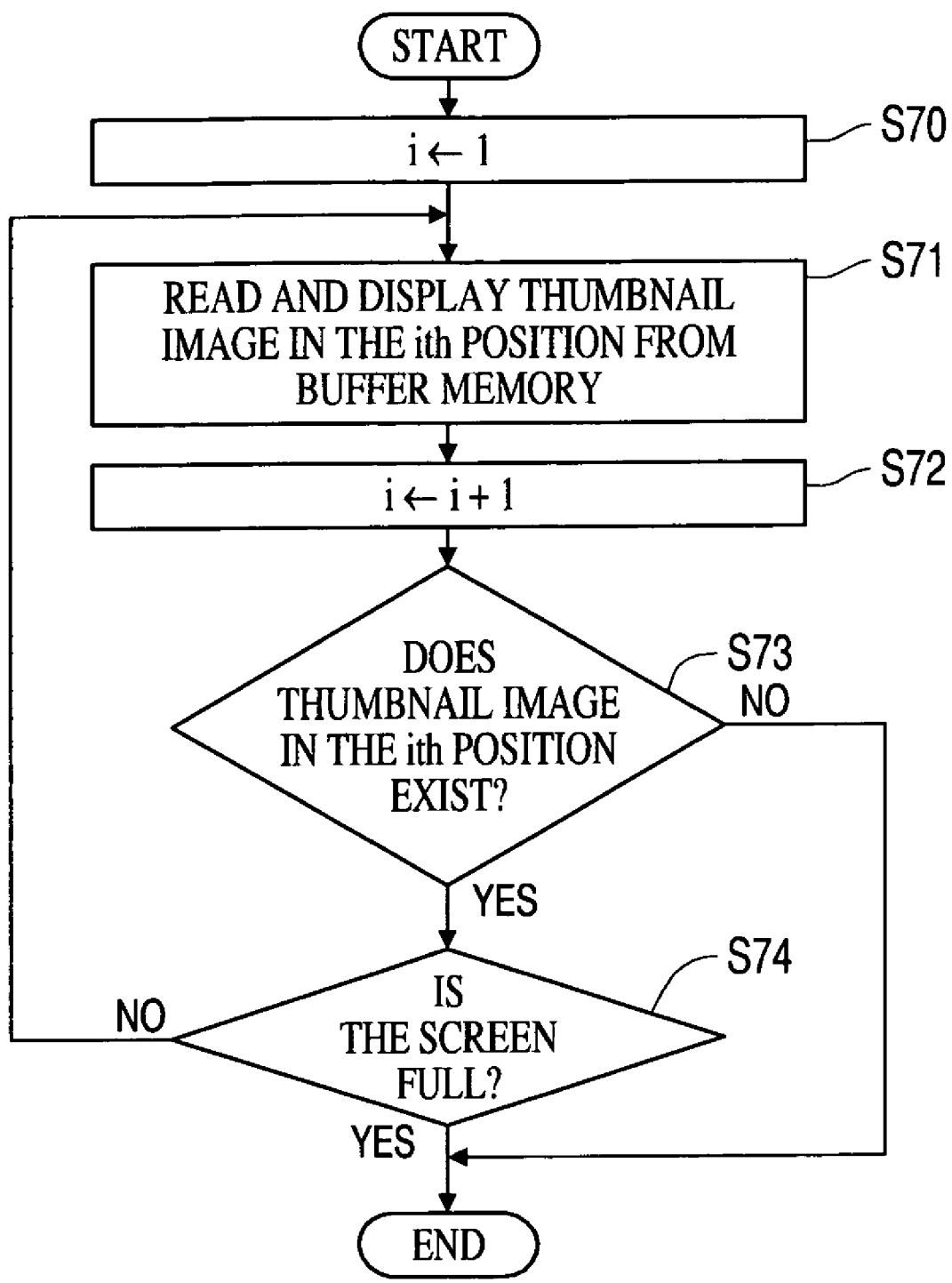
FIG. 13 is a flow chart describing one example of a process that displays the thumbnail image that is created by the process in FIG. 12.

FIG. 13 shows a flow chart that describes an example of a process that displays to the LCD 6 the thumbnail image that was created by the process in FIG. 12. This process is executed when the electronic camera 1 is set in the reproduction mode.

In step S70, the CPU 36 makes the initial setting of the variable i to 1. Next, in step S71, the CPU 36 reads the thumbnail image in the ith position that is stored in the buffer memory 35, and then displays it on the LCD 6. Flow proceeds to step S72 where the value of the variable i is increased by 1 increment. Then, in step S73, a determination is made as to whether the thumbnail image in the ith position exists in the buffer memory 35. The result being that if it is determined to be (YES) that the thumbnail image in the ith position exists, then flow proceeds to step S74. If it is determined to be (NO) that the thumbnail image in the ith position does not exist, then the process is completed (END).

In step S74, a determination is made as to whether the screen is full. The result being that if it is determined to be (YES) that the screen is full, then the process is completed (END). However, if it is determined to be (NO) that the screen is not full, then flow returns to step S71 where it repeats a similar process.

At this time, if the thumbnail images for the photo-images in the 22nd position through the 26th position (the photo-images V through Z) are stored in the buffer memory 35 as a result of the process in FIG. 12, then the process shown in FIG. 13 is executed. In that case, in the process of step S71, the thumbnail image in the first position (the thumbnail image for the photo-image V) is read from the buffer memory 35 and displayed in the upper-most row of the LCD 6. Further, in the process of step S73, it is determined to be (YES) that the thumbnail image in the second position exists thereby returning to step S71 where the similar process is repeated. The result of this being, as shown in FIG. 7, that the thumbnail images created from the photo-images V through Z that were photographed on June 30th, are displayed.

Figure 14:
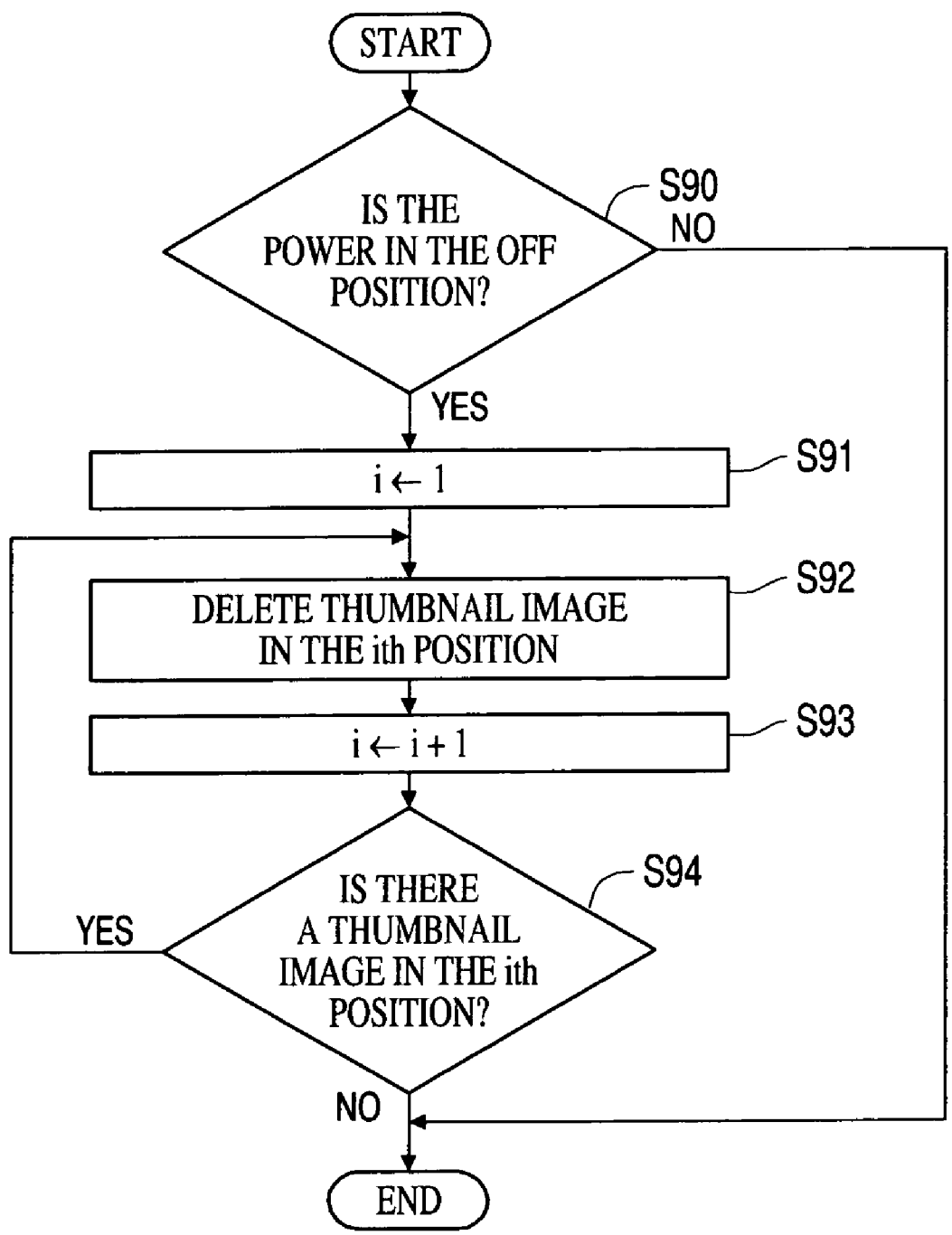
FIG. 14 is a flow chart describing a process that deletes the thumbnail image when the power switch is in the OFF position.

FIG. 14 is a flow chart that describes one example of the process for deleting thumbnail images created by the process in FIG. 12 and stored in the buffer memory 35. Since the CPU 36 of the present embodiment is a low energy consumption type, the electricity is always on. Accordingly, even when the power switch 11 is in the OFF position, the CPU 36 is able to execute certain processes.

The CPU 36, in step S90, determines whether the power switch 11 is in the OFF position. The result being that if it is determined to be (NO) that the power switch is not in the OFF position, then the process is completed (END). If it is determined to be (YES) that the power switch 11 is in the OFF position, then flow proceeds to step S91.

In step S91, the CPU 36 makes the initial setting for the variable i to 1. It then proceeds to step S92 where it deletes the thumbnail image in the ith position from the buffer memory 35. Flow then proceeds to step S93 where the value of the variable i is increased by 1 increment. In step S94, a determination is made as to whether the thumbnail image in the ith position exists. If it is determined to be (YES) that the thumbnail image in the ith position exists, then flow returns to step S92 where the similar process is repeated. Furthermore, in step S94, if it is determined to be (NO) that the thumbnail image in the ith position does not exist, then the process is completed (END).

At this point, the thumbnail images for the photo-images in the 22nd position through the 26th position are stored in the buffer memory 35 as a result of the process in FIG. 12 being executed. At this time, when the power switch 11 is turned to the OFF position, YES is determined to be the case in step S90. In step S92, the thumbnail image in the first position (the thumbnail image for the photo-image V) that is stored in the buffer memory 35 is deleted. In step S94, since the thumbnail image in the second position exists, YES is determined to be the case, and flow returns to step S92 where the similar process is repeated. The result being that the thumbnail images in the first through the fifth positions (the thumbnail images for the photo-images V through Z shown in FIG. 8) that are stored in the buffer memory 35 are deleted one after another in turn. Furthermore, the process is completed (END) at the point when the thumbnail image in the fifth position is deleted.

According to the processes described above, after turning on the power, if the input is not completed in more that the prescribed time period, the creation process of the thumbnail images is executed, and the created thumbnail images are stored in turn into the buffer memory 35. In this way, the created thumbnail images are displayed to the LCD 6 when the reproduction mode is selected. In addition, when the power switch 11 is in the OFF position, the thumbnail images that are stored in the buffer memory 35 are deleted.

The embodiment described above arranged the creation of one screen worth or one days worth of thumbnail images. However, embodiments of the invention may also be arranged to create the thumbnail images of all of the photo-images that are stored in the memory card 24.

Figure 15:
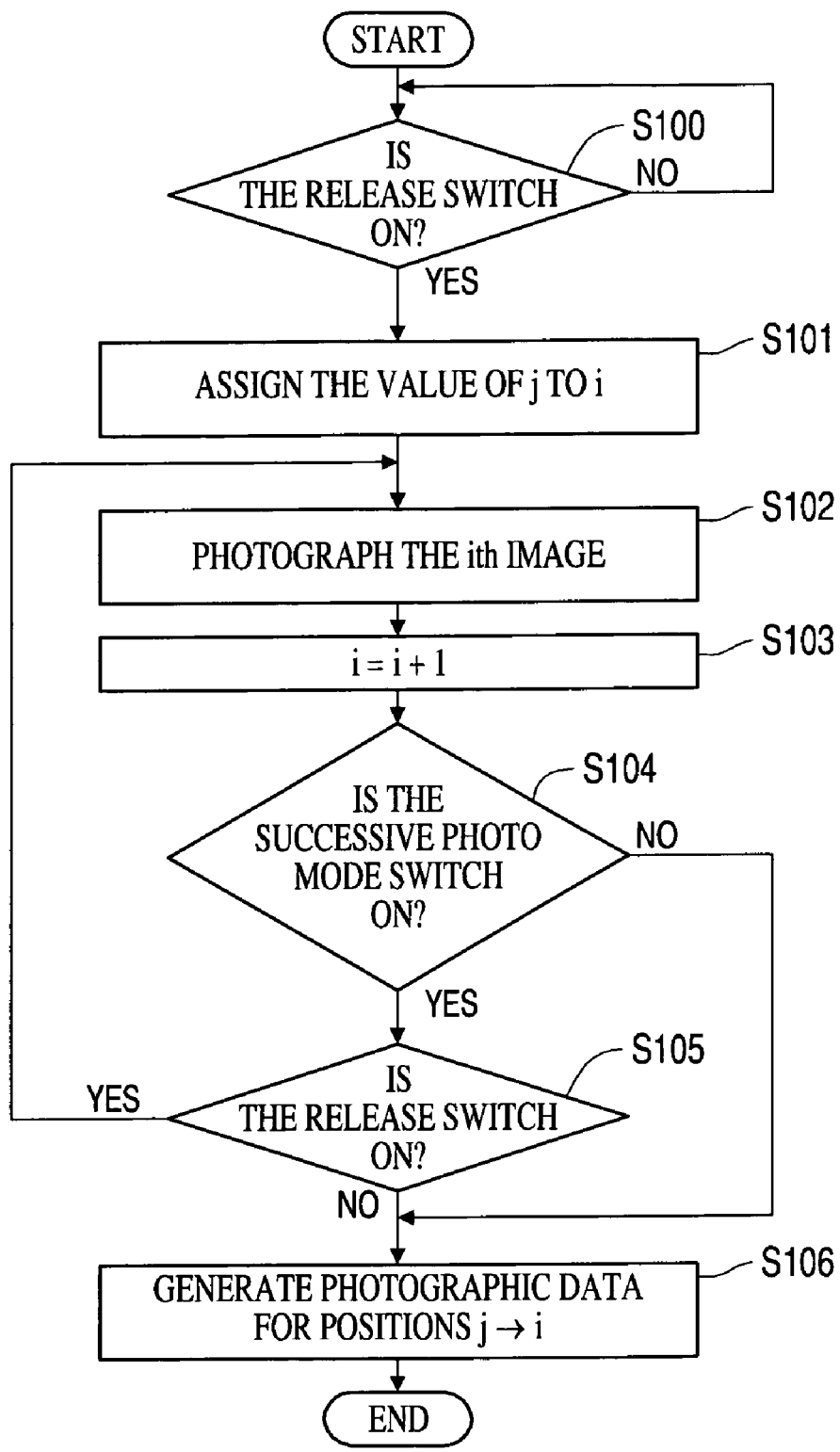
FIG. 15 is a flow chart of a process used to generate thumbnail images in the successive photography mode.

Thumbnail image generation for successive photography is described hereafter, with reference to FIG. 15. In step S100, a determination is made as to whether the release switch 10 is pressed. If it is not pressed, flow returns to step S100. If the release switch 10 is pressed, the value of j is assigned to variable i as the next photographic frame number in step S101. In step S102, the ith photographic frame is taken. Further, in step S103, the value of i is increased by 1.

Next, in step S104, a determination is made as to whether the successive photo mode is selected, in other words, whether the successive photo mode switch 13 is switched. In the case that the successive photo mode is selected, then in step S105 a determination is made as to whether the release switch 10 is continuously being pressed, and if it is determined to be continuously being pressed, the program returns to step S102 and continues photography.

On the other hand, if in step S104 it is determined not to be in the successive photo mode, or if it is determined in step S105 that the release switch 10 is not being pressed, then the program proceeds to step S106 where it creates the thumbnail of the frames j through i. However, when it is not in the successive photo mode, the values of j and i are equal.

According to the process described above, if the successive photo mode switch is in the H position, a thumbnail image is created after the successive photography is completed thereby avoiding any decrease in the successive photography speed.

The information processing apparatus according to aspects of the invention makes possible the creation of thumbnail images as necessary, reduces the required memory capacity for storing the thumbnail images while making possible the prompt creation of thumbnail images.

While this invention has been described in conjunction with specific embodiments thereof, it is evident that many alternatives, modifications and variations will be apparent to those skilled in the art. Accordingly, the preferred embodiments of the invention set forth herein are intended to be illustrative, not limiting. Various changes may be made without departing from the spirit and scope of the invention as defined in the following claims.

What is claimed is:

1. An information processing apparatus comprising:
    storage means for storing at least one picture image, the storage means removavly attached to the apparatus;
    thumbnail image creation means for reducing by a fixed ratio the at least one picture image stored in the storage means to create at least one thumbnail image;
    control means for controlling the thumbnail image creation means; and
    output means for outputting to a display the at least one thumbnail image created by the thumbnail image creation means,
wherein the control means controls the thumbnail image creation means to create as many of the thumbnail images as can be simultaneously displayed on one screen of the display and a prescribed number of additional thumbnail images to be newly displayed on the screen when the screen of said display is scrolled by the prescribed number of images.

2. The information processing apparatus of claim 1, wherein the control means controls the thumbnail image creation means to create the at least one thumbnail image a prescribed time after the image is stored.

3. The information processing apparatus of claim 1, wherein the control means controls the thumbnail image creation means to create the at least one thumbnail image when the apparatus enters a reproduction mode in which the at least one picture image stored in the storage means is reproduced.

4. The information processing apparatus of claim 1, wherein the control means controls the thumbnail image creation means to create the at least one thumbnail image when a power switch of the apparatus is switched to the ON position.

5. The information processing apparatus of claim 1, wherein the control means controls the thumbnail image creation means to create one or more thumbnail images that are to be newly displayed on the screen when the screen of the display is scrolled.

6. The information processing apparatus of claim 1, wherein the control means controls the thumbnail image creation means to create the at least one thumbnail image when a prescribed operation does not occur after a prescribed time period.

7. The information processing apparatus of claim 1, wherein the control means controls the thumbnail image creation means to create the at least one thumbnail image in order starting with either the newest or the oldest recording date and time of the at least one picture image.

8. The information processing apparatus of claim 1, wherein the control means controls the thumbnail image creation means to create the at least one thumbnail image in the order that thumbnail images are displayed on the display.

9. The information processing apparatus of claim 1, further comprising secondary recording means for recording the at least one thumbnail image created by the thumbnail image creation means; and wherein the control means erases the at least one thumbnail image recorded in the secondary recording means when the apparatus is changed from a reproduction mode, in which the apparatus reproduces the at least one picture image stored in the storage means, to a recording mode in which information is stored in the storage means.

10. The information processing apparatus of claim 1, further comprising secondary recording means for recording the at least one thumbnail image that was created by the thumbnail image creation means; and wherein the control means erases the at least one thumbnail image recorded in the secondary recording means when a power switch of the apparatus is switched to the OFF position.

11. The information processing apparatus of claim 1, wherein the display simultaneously displays the at least one thumbnail image and additional information that is related to the picture image from which the at least one thumbnail image was created.

12. The information processing apparatus of claim 1, wherein the apparatus is an electronic camera, the apparatus further comprising:
    photographing means for photographing objects to produce the at least one picture image; and
    recording means for recording the at least one picture image produced by the photographing means in the storage means.

13. The information processing apparatus of claim 12, wherein the apparatus is operable in a successive photo mode in which the object is photographed successively to produce a series of the picture images, and wherein the control means prohibits the creation of the thumbnail images during successive photography and controls the thumbnail image creation means to create thumbnail images subsequent to completing the successive photography.

14. The information processing apparatus of claim 1, further comprising compression/expansion means for compressing the at least one picture image and for expanding at least one compressed picture image, wherein the storage means stores the at least one compressed picture image compressed by the compression/expansion means, and wherein the thumbnail image creation means creates the thumbnail image from the at least one picture image expanded by the compression/expansion means.

15. An information processing apparatus comprising:
a memory in which at least one picture image is stored, the memory removably attached to the apparatus;
a thumbnail image generator coupled to the memory to generate at least one thumbnail image by reducing the at least one picture image stored in the memory by a fixed ratio;
a controller coupled to the thumbnail generator to control the thumbnail generator; and
a display coupled to the thumbnail generator to display the at least one thumbnail image generated by the thumbnail generator,
wherein the controller controls the thumbnail generator to generate as many of the thumbnail images as can be simultaneously displayed on one screen of the display and a prescribed number of additional thumbnail images to be newly displayed on the screen when the screen of said display is scrolled by the prescribed number of images.

16. The information processing apparatus of claim 15, wherein the controller controls the thumbnail generator to generate the at least one thumbnail image a prescribed time after the image is stored in the memory.

17. The information processing apparatus of claim 15, wherein the controller controls the thumbnail generator to generate the at least one thumbnail image when the apparatus enters a reproduction mode in which the at least one picture image stored in the memory is reproduced.

18. The information processing apparatus of claim 15, wherein the controller controls the thumbnail generator to generate the at least one thumbnail image when a power switch of the apparatus is switched to the ON position.

19. The information processing apparatus of claim 15, wherein the controller controls the thumbnail generator to generate one or more thumbnail images that are to be newly displayed on the screen when the screen of the display is scrolled.

20. The information processing apparatus of claim 15, wherein the controller controls the thumbnail generator to generate the at least one thumbnail image when a prescribed operation does not occur after a prescribed time period.

21. The information processing apparatus of claim 15, wherein the controller controls the thumbnail generator to generate the at least one thumbnail image in order starting with either the newest or the oldest recording date and time of the at least one picture image.

22. The information processing apparatus of claim 15, wherein the controller controls the thumbnail generator to generate the at least one thumbnail image in the order that thumbnail images are displayed on the display.

23. The information processing apparatus of claim 15, further comprising a buffer memory in which the at least one thumbnail image generated by the thumbnail generator is stored; and wherein the controller erases the at least one thumbnail image recorded in the buffer memory when the apparatus is changed from a reproduction mode, in which the apparatus reproduces the at least one picture image stored in the memory, to a recording mode in which information is stored in the memory.

24. The information processing apparatus of claim 15, further comprising a buffer memory in which the at least one thumbnail image that was generated by the thumbnail image generator is stored; and wherein the controller erases the at least one thumbnail image recorded in the buffer memory when a power switch of the apparatus is switched to the OFF position.

25. The information processing apparatus of claim 15, wherein the display simultaneously displays the at least one thumbnail image and additional information that is related to the picture image from which the at least one thumbnail image was generated.

26. The information processing apparatus of claim 15, wherein the apparatus is an electronic camera, the apparatus further comprising:
photographing system that photographs objects to produce the at least one picture image; and
a memory controller coupled to the memory to record the at least one picture image produced by the photographing system in the memory.

27. The information processing apparatus of claim 26, wherein the apparatus is operable in a successive photo mode in which the object is photographed successively to produce a series of the picture images, and wherein the controller prohibits the generation of the thumbnail images during successive photography and controls the thumbnail image generator to create thumbnail images subsequent to completing the successive photography.

28. The information processing apparatus of claim 15, further comprising a compression/expansion circuit that compresses the at least one picture image and that expands at least one compressed picture image, wherein the memory stores the at least one compressed picture image compressed by the compression/expansion circuit, and wherein the thumbnail image generator generates the thumbnail image from the at least one picture image expanded by the compression/expansion circuit.

29. A method of processing information to create thumbnail images in an information processing apparatus, the method comprising the steps of:
storing at least one picture image in memory that is removably attached to the apparatus;
creating at least one thumbnail image by reducing the at least one picture image stored in the memory by a fixed ratio;
controlling the thumbnail image creation step; and
outputting to a display the at least one thumbnail image, wherein the controlling step controls the thumbnail image creating step to create as many of the thumbnail images as can be simultaneously displayed on one screen of the display and a prescribed number of additional thumbnail images to be newly displayed on the screen when the screen of the display is scrolled by the prescribed number of images.

30. The method of claim 29, wherein the controlling step controls the thumbnail image creating step to create the at least one thumbnail image a prescribed time after the image is stored in the memory.

31. The method of claim 29, wherein the controlling step controls the thumbnail image creating step to create the at least one thumbnail image when the apparatus enters a reproduction mode in which the at least one picture image stored in the memory is reproduced.

32. The method of claim 29, wherein the controlling step controls the thumbnail image creating step to create the at least one thumbnail image when a power switch of the apparatus is switched to the ON position.

33. The method of claim 29, wherein the controlling step controls the thumbnail image creating step to create one or more thumbnail images that are to be newly displayed on the screen when the screen of the display is scrolled.

34. The method of claim 29, wherein the controlling step controls the thumbnail image creating step to create the at least one thumbnail image when a prescribed operation does not occur after a prescribed time period.

35. The method of claim 29, wherein the controlling step controls the thumbnail image creating step to create the at least one thumbnail image in order starting with either the newest or the oldest recording date and time of the at least one picture image.

36. The method of claim 29, wherein the controlling step controls the thumbnail image creating step to create the at least one thumbnail image in the order that thumbnail images are displayed on the display.

37. The method of claim 29, further comprising recording the at least one thumbnail image created by the thumbnail image creating step in a buffer memory; and wherein the controlling step erases the at least one thumbnail image recorded in the buffer memory when the apparatus is changed from a reproduction mode, in which the apparatus reproduces the at least one picture image stored in the memory, to a recording mode in which information is stored in the memory.

38. The method of claim 29, further comprising recording the at least one thumbnail image that was created by the thumbnail image creating step in a buffer memory; and wherein the controlling step erases the at least one thumbnail image recorded in the buffer memory when a power switch of the apparatus is switched to the OFF position.

39. The method of claim 29, wherein the displaying step simultaneously displays the at least one thumbnail image and additional information that is related to the picture image from which the at least one thumbnail image was created.

40. The method of claim 29, wherein the apparatus is an electronic camera, the method further comprising the steps of:
  photographing objects to produce the at least one picture image; and
  recording the at least one picture image produced during the photographing step in the memory.

41. The method of claim 40, wherein the apparatus is operable in a successive photo mode in which the object is photographed successively to produce a series of the picture images, and wherein the controlling step prohibits the creation of the thumbnail images during successive photography and controls the thumbnail image creating step to create thumbnail images subsequent to completing the successive photography.

42. The method of claim 29, further comprising:
  compressing the at least one picture image and subsequently expanding at least one compressed picture image,
  wherein the storing step stores the at least one compressed picture image in the memory, and
  wherein the thumbnail image creating step creates the thumbnail image from the at least one picture image expanded from the at least one compressed picture image.

* * * * *